United States Patent
Dingli et al.

(10) Patent No.: US 12,270,392 B2
(45) Date of Patent: Apr. 8, 2025

(54) AUDIO CONTROL TO MASK VEHICLE COMPONENT NOISE

(71) Applicant: Pony AI Inc., Grand Cayman (KY)

(72) Inventors: Robert Dingli, Cupertino, CA (US); Peter G. Diehl, Shanghai (CN)

(73) Assignee: Pony AI Inc., Grand Cayman (KY)

( * ) Notice: Subject to any disclaimer, the term of this patent is extended or adjusted under 35 U.S.C. 154(b) by 333 days.

(21) Appl. No.: 17/505,552

(22) Filed: Oct. 19, 2021

(65) Prior Publication Data

US 2022/0036872 A1    Feb. 3, 2022

Related U.S. Application Data

(63) Continuation of application No. 16/884,712, filed on May 27, 2020, now Pat. No. 11,151,974.

(51) Int. Cl.

| | |
|---|---|
| *F04B 49/03* | (2006.01) |
| *B60S 1/52* | (2006.01) |
| *B60S 1/54* | (2006.01) |
| *B60S 1/56* | (2006.01) |
| *F04B 41/02* | (2006.01) |
| *F04B 49/02* | (2006.01) |
| *G02B 27/00* | (2006.01) |
| *G06F 17/14* | (2006.01) |
| *G10K 11/178* | (2006.01) |
| *G10K 15/02* | (2006.01) |
| *H04S 7/00* | (2006.01) |

(52) U.S. Cl.
CPC ............... *F04B 49/03* (2013.01); *B60S 1/52* (2013.01); *B60S 1/54* (2013.01); *B60S 1/56* (2013.01); *F04B 41/02* (2013.01); *F04B 49/022* (2013.01); *G02B 27/0006* (2013.01); *F04B 2205/04* (2013.01); *F04B 2205/05* (2013.01); *F04B 2205/08* (2013.01); *G06F 17/142* (2013.01); *G10K 11/17813* (2018.01); *G10K 15/02* (2013.01); *G10K 2210/109* (2013.01); *H04S 7/307* (2013.01)

(58) Field of Classification Search
CPC .............. F04B 2205/05; F04B 2205/04; F04B 2205/08; F04B 41/02; F04B 49/03; F04B 49/022; B60S 1/56; B60S 1/54; B60S 1/52; G02B 27/0006; G10K 2210/109
See application file for complete search history.

(56) References Cited

U.S. PATENT DOCUMENTS

| | | |
|---|---|---|
| 5,499,301 A | 3/1996 | Sudo |
| 5,511,127 A | 4/1996 | Warnaka |
| 6,002,778 A | 12/1999 | Rossetti |
| 8,855,329 B2 | 10/2014 | Slapak et al. |

(Continued)

*Primary Examiner* — Peter J Bertheaud
(74) *Attorney, Agent, or Firm* — Sheppard, Mullin, Richter & Hampton LLP; Xin Xie

(57) ABSTRACT

An apparatus on a vehicle comprises one or more sensors, one or more nozzles that output fluid to clean the respective one or more sensors, and a compressor that generates fluid such as compressed air. The compressor is in fluid communication with the one or more nozzles. The apparatus further comprises one or more processors, and a memory storing instructions that, when executed by the one or more processors, cause the system to determine information of an acoustic emission from the compressor and to counteract the acoustic emission based on the determined information.

17 Claims, 17 Drawing Sheets

(56) References Cited

U.S. PATENT DOCUMENTS

| | | |
|---|---|---|
| 8,857,200 B2 | 10/2014 | Stover |
| 9,897,103 B2 | 2/2018 | Kamiya |
| 10,094,380 B2 | 10/2018 | Doepker |
| 11,151,974 B1 | 10/2021 | Dingli et al. |
| 11,565,286 B2 * | 1/2023 | Dingli ................. B60S 1/54 |
| 11,565,664 B2 * | 1/2023 | Dingli ................. B08B 3/02 |
| 11,986,865 B2 * | 5/2024 | Dingli ................. B60S 1/66 |
| 2015/0010163 A1 | 1/2015 | Ganeshkumar |
| 2015/0063582 A1 | 3/2015 | Pan |
| 2015/0092957 A1 | 4/2015 | Osawa |
| 2020/0282416 A1 * | 9/2020 | Fiebrandt .......... B05B 1/3006 |
| 2020/0291964 A1 | 9/2020 | Goto |

\* cited by examiner

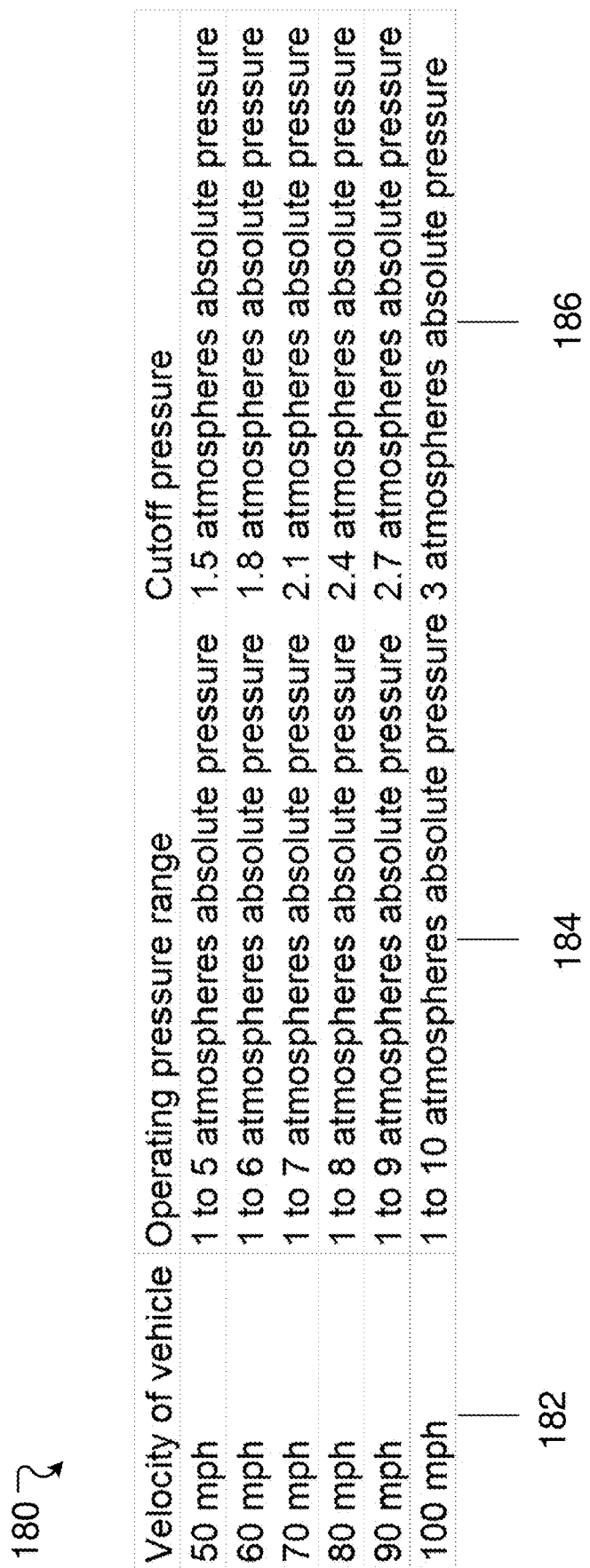

FIG. 1D

| Velocity of vehicle | Operating pressure range | Cutoff pressure |
|---|---|---|
| 50 mph | 1 to 5 atmospheres absolute pressure | 1.5 atmospheres absolute pressure |
| 60 mph | 1 to 6 atmospheres absolute pressure | 1.8 atmospheres absolute pressure |
| 70 mph | 1 to 7 atmospheres absolute pressure | 2.1 atmospheres absolute pressure |
| 80 mph | 1 to 8 atmospheres absolute pressure | 2.4 atmospheres absolute pressure |
| 90 mph | 1 to 9 atmospheres absolute pressure | 2.7 atmospheres absolute pressure |
| 100 mph | 1 to 10 atmospheres absolute pressure | 3 atmospheres absolute pressure |

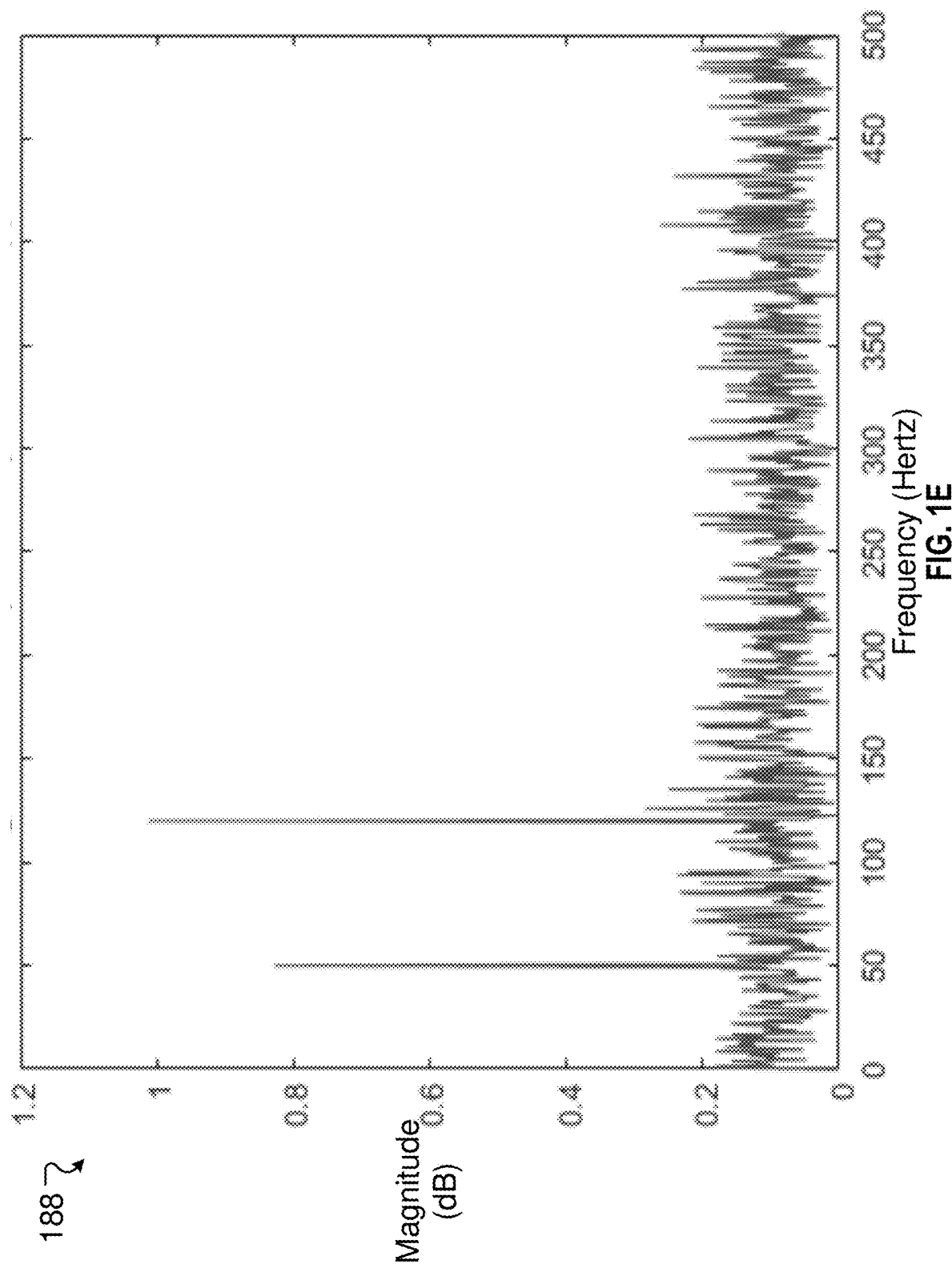

AUDIO CONTROL TO MASK VEHICLE COMPONENT NOISE

CROSS REFERENCE TO RELATED APPLICATIONS

This application is a continuation application of U.S. application Ser. No. 16/884,712, filed May 27, 2020, the content of which is hereby incorporated by reference in its entirety.

TECHNICAL FIELD

The present invention relates generally to sensor assembly cleaning systems and apparatuses and methods of operation thereof, and more particularly, in some embodiments, to sensor assembly cleaning systems and apparatuses that employ a compressor, the operation of which is adjusted based on a speed, predicted speed, other driving parameter of a vehicle, or other parameter. The present invention further relates to noise reduction or cancellation mechanisms.

BACKGROUND

A vehicle, such as an autonomous vehicle, includes a myriad of sensors that provide continuous streams of sensor data captured from the vehicle's surrounding environment. Such sensor data enables an autonomous vehicle to perform a number of functions that would otherwise be performed by a manual human operator including various vehicle navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, and automated distance control.

A vehicle such as an autonomous vehicle can include a variety of different types of on-board sensors including, for example, cameras, light detection and ranging (LiDAR) systems, radar systems, Global Positioning System (GPS) devices, sonar-based sensors, ultrasonic sensors, accelerometers, gyroscopes, magnetometers, inertial measurement units (IMUs), and far infrared (FIR) sensors. On-board vehicle sensors disposed on an exterior of a vehicle may be provided in or integrated with protective housing to protect the sensors from damage from the elements. The housing, however, can be subjected to environmental elements such as rain, heat, wind, dust, or the like that can impede the ability of sensors encased in the housing to perform their functions. Technical solutions that mitigate the effect of such factors on sensor performance and enhance the functional capabilities of sensors, such as cleaning, are described herein.

Additionally, noise may be generated from the operations of the cleaning. Technical solutions that mitigate the effects of the noise specifically generated from the operations of the cleaning are described herein.

SUMMARY

In some embodiments, an apparatus on a vehicle comprises one or more sensors; one or more nozzles configured to output fluid to clean the respective one or more sensors; and a compressor configured to generate the fluid, the compressor being in fluid communication with the one or more nozzles; one or more processors; and a memory storing instructions that, when executed by the one or more processors, cause the system to perform: determining information of an acoustic emission from the compressor; and counteracting the acoustic emission based on the determined information.

In some embodiments, the apparatus further comprises: a microphone disposed within a threshold distance of the compressor and configured to capture the acoustic emission from the compressor; and the determining information of the acoustic emission from the compressor comprises determining spectral information comprising one or more frequencies of the captured acoustic emission.

In some embodiments, the determining information of an acoustic emission from the compressor further comprises: compensating the spectral information based on an acoustic emission generated independently of the compressor.

In some embodiments, the compensating the spectral information based on the acoustic emission generated independently of the compressor comprises: acquiring a Fourier transform associated with the acoustic emission from the compressor; acquiring a second Fourier transform associated with a second acoustic emission when the compressor is not operating, the second acoustic emission captured at a same location as the acoustic emission; and subtracting, for a particular frequency value associated with the Fourier transform and the second Fourier transform, an associated magnitude value of the second Fourier transform from an associated magnitude value of the Fourier transform.

In some embodiments, the compensating the spectral information based on the acoustic emission generated independently of the compressor comprises: acquiring data indicating magnitudes of respective frequencies associated with the acoustic emission from the compressor; acquiring second data indicating second magnitudes of respective frequencies associated with a second acoustic emission when the compressor is not operating, the second acoustic emission captured at a same location as the acoustic emission; and subtracting, for a particular frequency value of the respective frequencies, a second magnitude of the second magnitudes associated with a second acoustic emission from a magnitude of the magnitudes associated with the acoustic emission.

In some embodiments, the determining information of the acoustic emission from the compressor further comprises: determining, based on different operating speeds of the compressor, the respective one or more frequencies of the captured acoustic emission.

In some embodiments, the determining information of the acoustic emission from the compressor further comprises: determining, for different operating speeds of the compressor, respective dominant frequencies of the captured acoustic emission.

In some embodiments, the apparatus further comprises a speaker disposed within a second threshold distance of the compressor; and wherein the counteracting the acoustic emission based on the determined information comprises: controlling the speaker to generate an acoustic signal having a same frequency as one or more frequencies of the captured acoustic emission and a phase different from a phase of the captured acoustic emission.

In some embodiments, the apparatus further comprises a filter configured to filter the acoustic emission from the compressor, the filter comprising: tapered pipes, each of the tapered pipes having pressure sensing inlets and incrementally increasing in diameter to attenuate the acoustic emission.

In some embodiments, the apparatus further comprises a filter configured to filter the acoustic emission from the compressor, the filter comprising: inlets arranged in a circular pattern and connected by pipes, each of the pipes comprising cylindrical plugs having holes.

In some embodiments, the apparatus further comprises a filter configured to filter the noise from the airflow, the filter comprising: a capillary tube, a closed volume chamber connected to the capillary tube, and a pressure transducer connected to the closed volume chamber.

In some embodiments, the apparatus further comprises an active damping system comprising a resonance circuit having: a vibration sensor; a battery; a DC-AC inverter; a piezoelectric element configured to be excited at a frequency range centered on a resonance frequency of the noise and to generate a voltage corresponding to the frequency range; an AC-DC rectifier; a control circuit configured to generate a signal having an opposite phase of the generated voltage; and a piezoelectric actuator configured to output a force corresponding to the signal having the opposite phase to oppose the noise.

Various embodiments of the present disclosure provide a method implemented by a computing system including one or more processors and storage media storing machine-readable instructions, wherein the method is performed using the one or more processors. The method may clean one or more sensors on a vehicle. The method may comprise generating, by a compressor of a vehicle, a fluid; determining information of an acoustic emission from the compressor; counteracting the acoustic emission based on the determined information; and outputting, by one or more nozzles in fluid communication with the compressor, the fluid to the respective one or more respective sensors to clean the respective one or more sensors.

In some embodiments, the method further comprises: capturing, by a microphone disposed within a threshold distance of the compressor, the acoustic emission from the compressor; and the determining information of the acoustic emission from the compressor comprises determining spectral information comprising one or more frequencies of the captured acoustic emission.

In some embodiments, the determining information of an acoustic emission from the compressor further comprises: compensating the spectral information based on an acoustic emission generated independently of the compressor.

In some embodiments, the compensating the spectral information based on the acoustic emission generated independently of the compressor comprises: acquiring a Fourier transform associated with the acoustic emission from the compressor; acquiring a second Fourier transform associated with a second acoustic emission when the compressor is not operating, the second acoustic emission captured at a same location as the acoustic emission; subtracting, for a particular frequency value associated with the Fourier transform and the second Fourier transform, an associated magnitude value of the second Fourier transform from an associated magnitude value of the Fourier transform.

In some embodiments, the compensating the spectral information based on the acoustic emission generated independently of the compressor comprises: acquiring data indicating magnitudes of respective frequencies associated with the acoustic emission from the compressor; acquiring second data indicating second magnitudes of respective frequencies associated with a second acoustic emission when the compressor is not operating, the second acoustic emission captured at a same location as the acoustic emission; and subtracting, for a particular frequency value of the respective frequencies, a second magnitude of the second magnitudes associated with a second acoustic emission from a magnitude of the magnitudes associated with the acoustic emission.

In some embodiments, the determining information of the acoustic emission from the compressor further comprises: determining, based on different operating speeds of the compressor, the respective one or more frequencies of the captured acoustic emission.

In some embodiments, the determining information of the acoustic emission from the compressor further comprises: determining, for different operating speeds of the compressor, respective dominant frequencies of the captured acoustic emission.

In some embodiments, the counteracting the acoustic emission based on the determined information comprises: controlling a speaker to generate an acoustic signal having a same frequency as one or more frequencies of the captured acoustic emission and a phase different from a phase of the captured acoustic emission, the speaker being disposed within a threshold distance of the compressor.

In some embodiments, an apparatus on a vehicle comprises one or more sensors; one or more nozzles configured to output fluid to clean the respective one or more sensors; and a compressor configured to generate the fluid, the compressor being in fluid communication with the one or more nozzles; one or more processors; and a memory storing instructions that, when executed by the one or more processors, cause the system to perform: determining a current velocity of the vehicle; controlling an operation of the compressor based on the current velocity of the vehicle.

In some embodiments, the apparatus further comprises a reservoir disposed between the compressor and a respective nozzle of the one or more nozzles, the reservoir configured to store an amount of the fluid; a pressure sensor configured to determine a fluid pressure inside the reservoir; and the instructions further cause the system to perform: determining whether a sensor of the one or more sensors is to be cleaned; in response to determining that the sensor is to be cleaned, and in response to the fluid pressure inside the reservoir satisfying a threshold pressure, expelling a portion of the fluid from a respective nozzle of the nozzles towards the sensor.

In some embodiments, the determining whether the sensor is to be cleaned comprises: determining whether a concentration of one or more foreign substances on the sensor satisfying a threshold concentration; and in response to determining that the concentration of the one or more foreign substances on the sensor satisfies the threshold concentration, determining that the sensor is to be cleaned.

In some embodiments, the determining whether the sensor is to be cleaned comprises: in response to determining that the concentration of the one or more foreign substances on the sensor fails to satisfy the threshold concentration, determining that the sensor is not to be cleaned; and the instructions further cause the system to perform: in response to determining that the sensor is not to be cleaned, shutting off a flow of the fluid from the nozzle.

In some embodiments, the controlling the operation of the compressor comprises determining an operating pressure range of the compressor based on a traffic signal.

In some embodiments, the controlling the operation of the compressor comprises determining an operating pressure range of the compressor based on the current velocity of the vehicle.

In some embodiments, the instructions further cause the system to perform: predicting a future velocity of the vehicle; and the controlling the operation of the compressor comprises determining an operating pressure range of the compressor based on the predicted future velocity of the vehicle.

In some embodiments, the instructions further cause the system to perform: predicting a start of a navigation event of the vehicle; and synchronizing an adjustment of an operating pressure range of the compressor with the predicted start of the navigation event of the vehicle.

In some embodiments, the controlling the operation of the compressor comprises determining an operating pressure range of the compressor based on a frequency of cleaning of the one or more sensors.

In some embodiments, the instructions further cause the system to perform: determining a current acceleration of the vehicle; predicting a future acceleration of the vehicle; and the controlling the operation of the compressor comprises determining an operating pressure range of the compressor based on any of the current acceleration of the vehicle or the predicted future acceleration of the vehicle.

In some embodiments, the controlling the operation of the compressor comprises determining an amount of traffic; and determining an operating pressure range of the compressor based on an amount of traffic.

In some embodiments, reservoirs may be disposed between the compressor and the nozzles. Each of the reservoirs may be configured to store an amount of the fluid. Exit pressures may be different at each of the respective nozzles. The instructions may further cause the system to perform, determining a concentration of one or more foreign substances on a sensor of the one or more sensors; and selecting one of the reservoirs from which to expel a portion of the fluid based on the determined concentration of the one or more foreign substances.

Various embodiments of the present disclosure provide a method implemented by a computing system including one or more processors and storage media storing machine-readable instructions, wherein the method is performed using the one or more processors. The method may comprise generating, by a compressor of a vehicle, a fluid; determining a current velocity of the vehicle; controlling an operation of the compressor based on the current velocity of the vehicle; and outputting, by one or more nozzles in fluid communication with the compressor, the fluid to one or more respective sensors to clean the respective one or more sensors.

In some embodiments, the method further comprises: storing an amount of the fluid in a reservoir disposed between the compressor and a respective nozzle of the one or more nozzles; determining, using a pressure sensor, a fluid pressure inside the reservoir; determining whether a sensor of the one or more sensors is to be cleaned; and in response to determining that the sensor is to be cleaned, and in response to the fluid pressure inside the reservoir satisfying a threshold pressure, expelling a portion of the fluid from a respective nozzle of the nozzles towards the sensor.

In some embodiments, the determining whether the sensor is to be cleaned comprises: determining whether a concentration of one or more foreign substances on the sensor satisfies a threshold concentration; and in response to determining that the concentration of the one or more foreign substances on the sensor satisfies the threshold concentration, determining that the sensor is to be cleaned.

In some embodiments, the determining whether the sensor is to be cleaned comprises: in response to determining that the concentration of the one or more foreign substances on the sensor fails to satisfy the threshold concentration, determining that the sensor is not to be cleaned; and the method further comprises: in response to determining that the sensor is not to be cleaned, shutting off a flow of the fluid from the nozzle.

In some embodiments, the method further comprises: predicting a future velocity of the vehicle; and the controlling the operation of the compressor comprises determining an operating pressure range of the compressor based on the predicted future velocity of the vehicle.

In some embodiments, the method further comprises: predicting a start of a navigation event of the vehicle; and synchronizing an adjustment of an operating pressure range of the compressor with the predicted start of the navigation event of the vehicle.

In some embodiments, the method further comprises: determining a current acceleration of the vehicle; predicting a future acceleration of the vehicle; and the controlling the operation of the compressor comprises determining an operating pressure range of the compressor based on any of the current acceleration of the vehicle or the predicted future acceleration of the vehicle.

In some embodiments, the method further comprises: storing amounts of the fluid in each of respective reservoirs disposed between the compressor and the nozzles, each of the respective reservoirs having different exit pressures; determining a concentration of one or more foreign substances on a sensor of the one or more sensors; and selecting one of the reservoirs from which to expel a portion of the fluid based on the determined concentration of the one or more foreign substances.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 1D illustrates an example of a relationship to clarify an example operation of a compressor of the sensor cleaning apparatus. In FIG. 1D, a relationship between a velocity of a vehicle, an operating pressure range, and a cutoff pressure is shown.

FIG. 1E illustrates an exemplary operation of a computing system of the sensor cleaning apparatus.

DETAILED DESCRIPTION

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Figure 1A:
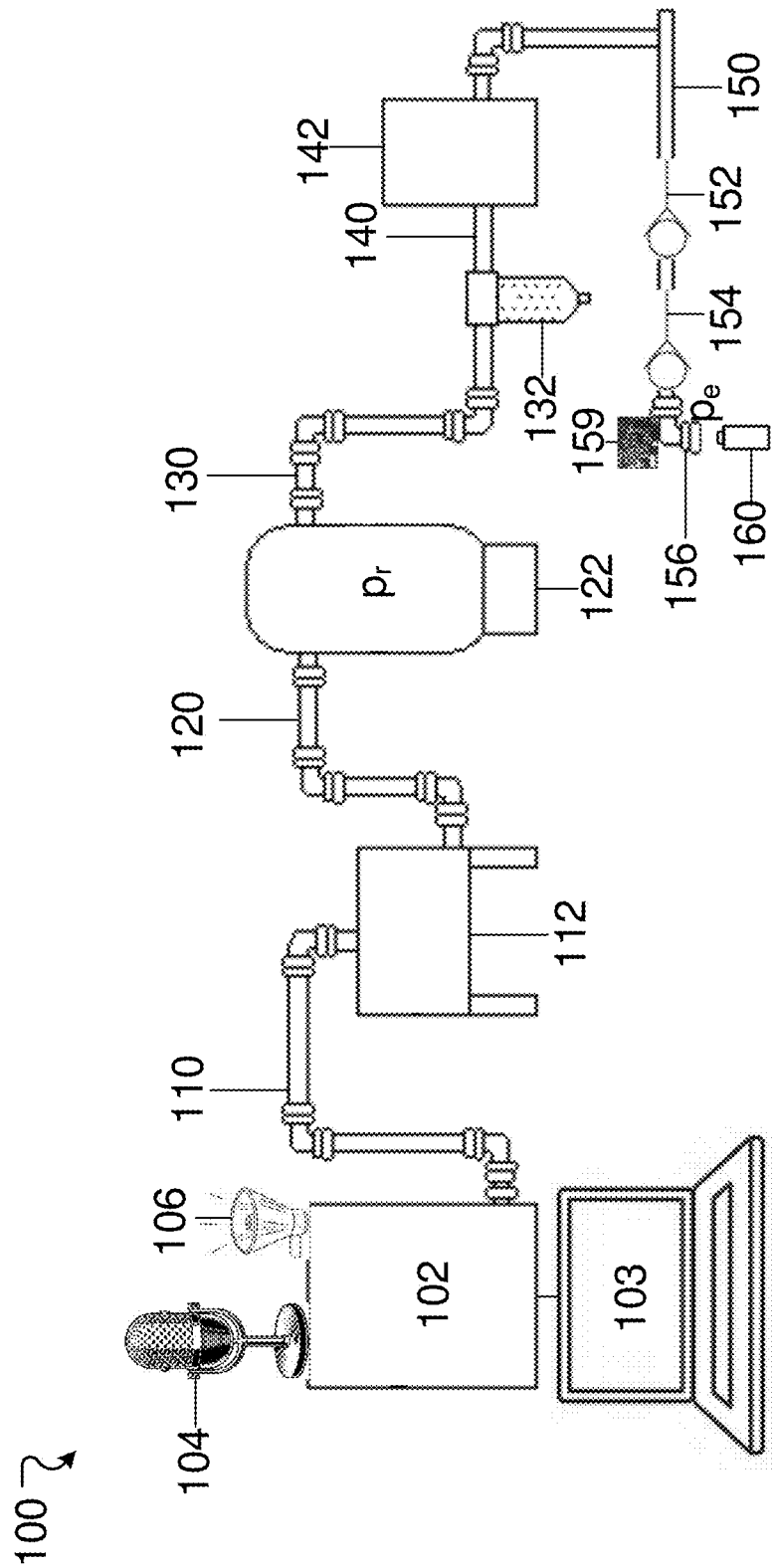
FIG. 1A illustrates a sensor cleaning apparatus in accordance with an example embodiment of the present disclosure.

FIG. 1A illustrates a sensor cleaning apparatus 100 comprising a compressor 102 and a computing system 103 that controls operations of the compressor 102 and/or other related components described below. The computing system 103 may comprise one or more processors. The compressor 102 may be configured to generate a fluid such as compressed air. In some examples, the compressor 102 may operate adiabatically, isothermally, or transitionally from adiabatic to isothermal. An absolute pressure of the generated compressed air may be between 2 atmospheres and 100 atmospheres in absolute pressure. At a base of the compressor 102 may be a base pan with additional plates to provide structural impedance to reduce noise. In some embodiments, the sensor cleaning apparatus 100 may further include noise cancellation mechanisms to specifically cancel out or reduce noise generated by the compressor 102. Other similar noise cancellation mechanisms to address noise generated by other components or operations of the sensor cleaning apparatus 100 and/or a vehicle on which the sensor cleaning apparatus is being implemented may be disposed elsewhere. In some embodiments, the sensor cleaning apparatus 100 may further comprise a microphone 104 and a speaker 106. The microphone 104 and the speaker 106 may be directly or indirectly connected to the compressor 102, and be located within a threshold distance of the compressor 102. The computing system 103 may acquire information, from the microphone 104, of one or more acoustic emissions of the compressor 102, which may include one or more frequencies of the acoustic emissions. The acoustic emissions may comprise noise. The computing system 103 may associate or synchronize the information of the one or more frequencies with a current compressor speed information, which may include an operating or rotational speed of the compressor 102, to determine relationships between the compressor speed and respective frequencies of the acoustic emissions at different compressor speeds and/or different compressor operations. For example, at one operating speed of the compressor 102, such as 1000 revolutions per minute, a most common frequency of acoustic emissions may be 50 to 60 Hertz while at another operating speed such as 3000 revolutions per minute, a most common frequency of acoustic emissions may be 100 to 120 Hertz. The computing system 103 may convert the one or more acoustic emissions captured by the microphone 104 using a Fourier Transform such as a Fast Fourier Transform to acquire the individual spectral components and frequency information of the one or more acoustic emissions, as shown, for example, in FIG. 1E. The computing system 103 may also acquire information indicating magnitudes of respective frequencies associated with the one or more acoustic emissions in other manners. The computing system 103 may determine, at the different compressor speeds and/or operations, respective dominant frequencies of the captured acoustic emission.

At each operating speed of the compressor 102, the computing system 103 may subtract out the frequency information of the individual spectral components captured by the microphone 104 when the compressor 102 is off. This operation is described in more detail with reference to FIG. 1F. For example, the computing system 103 may subtract the y-axis values indicating magnitudes or respective frequency components obtained using a Fourier transform when the compressor 102 is turned off, from the corresponding y-axis values when the compressor 102 is operating at a certain speed. Thus, information of acoustic emissions while the compressor 102 is off may also be acquired by the computing system 103 so that such frequencies when the compressor 102 is off may be used as a control or baseline to compensate for noise that is generated independent of the compressor 103. The computing system 103 may thus determine which frequencies of acoustic emissions are not generated by the compressor 102. Meanwhile, the computing system 103 may control the speaker 106 to generate an acoustic emission such as a noise of a same frequency or frequencies and an opposing phase or phases compared to that or those of the acoustic emissions resulting from the compressor 102, for example, including the noise detected using the microphone 104 and the computing system 103 after compensating for noise that is generated independent of the compressor 102. A magnitude of the generated acoustic emission may be approximately equal to or proportional to a magnitude of the compensated acoustic emission or the of the uncompensated acoustic emission at the frequency of frequencies. Alternatively, the speaker 106 may be disposed in a passenger cabin of the vehicle. The computing system 103 may further determine or predict times at which the compressor 102 will or may be turned on and at what operating speed the compressor 102 will operate at. The computing system 103 may control the speaker 106 to operate during the determined or predicted times, and compensate for the noise generated by the compressor 102 based on the operating speed of the compressor 102.

The sensor cleaning apparatus 100 may comprise multiple microphones and/or speakers. Each of the microphones may detect a particular range of frequencies and each speaker may output a particular range of frequencies. In some embodiments, the sensor cleaning apparatus 100 may further comprise a filter or resonator that reduces or eliminates an amount of noise from the compressor 102. Such embodiments are further described in reference to FIGS. 5-10, and may be used in conjunction with the microphone 104 to detect the particular frequencies specific to the compressor 102, and/or the speaker 106. The operations described in reference to FIGS. 5-10 may be controlled at least in part by the computing system 103, controlled separately from the computing system 103, and/or controlled by another set of processors. The sensor cleaning apparatus 100 may further comprise an absorptive muffler that absorbs waves of particular frequencies and/or a reactive muffler comprising lumped elements that reflects waves of particular frequencies.

Figure 1B:
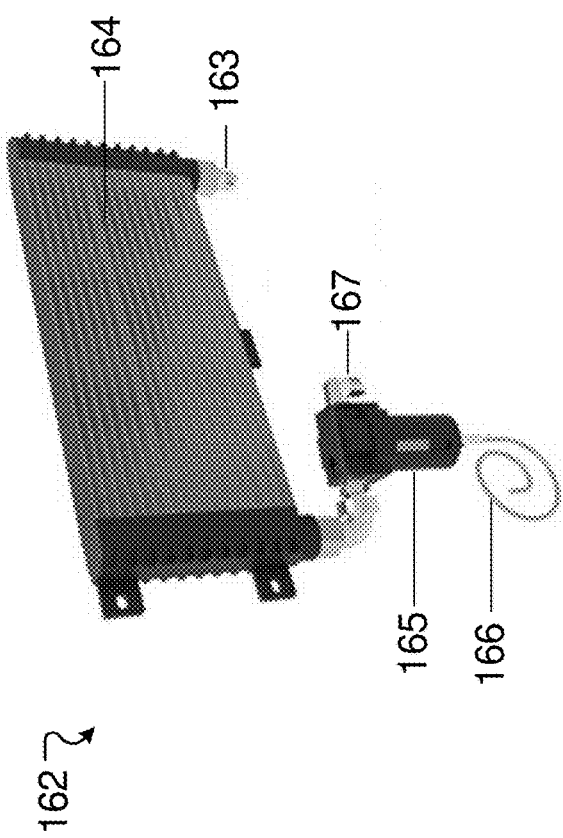
FIG. 1B illustrates an aftercooler associated with the sensor cleaning apparatus in accordance with an example embodiment of the present disclosure

Downstream of the compressor 102, a first connection 110 may be fastened, secured, directly connected, or otherwise fluidly connected to the compressor 102. The first connection 110 may comprise a pipe or a duct. The first connection 110 may be fastened, secured, directly connected, or otherwise fluidly connected to an aftercooler 112 that cools the air from the compressor 102. In some embodiments, as shown in FIG. 1B, the aftercooler 112 may comprise a spiral finned tube coil or a plate-fin coil with baffle plates and a motor-driven fan. In some examples, the aftercooler 112 may further comprise a moisture separator, that mechanically separates most or all of liquid moisture condensed from, and solids from the compressed air. In some examples, the baffle plates may utilize centrifugal force to accumulate the moisture and solids at a bottom of the moisture separator. In some examples, the aftercooler 112 may further comprise a drain may remove the moisture and solids.

The aftercooler 112 may be fastened, secured, directly connected, or otherwise fluidly connected to a second connection 120 of FIG. 1A. The second connection 120 may comprise a pipe or a duct. The second connection 120 may be fastened, secured, directly connected, or otherwise fluidly connected to a reservoir 122 that stores an amount of the fluid such as the compressed air. The reservoir 122 may store the fluid at a pressure $p_r$.

Figure 1C:
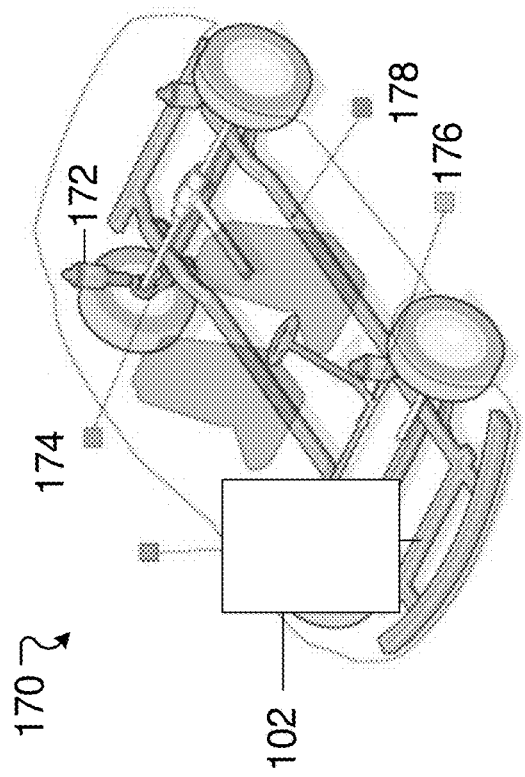
FIG. 1C illustrates a vehicle associated with the sensor cleaning apparatus in accordance with an example embodiment of the present disclosure.

The reservoir 122 may be fastened, secured, directly connected, or otherwise fluidly connected to a third connection 130. The third connection 130 may comprise a pipe or a duct. The third connection 130 may be fastened, secured, directly connected, or otherwise fluidly connected to a filter 132 that further filters dust and solid particulates from the fluid or compressed air. The filter 132 may be fastened, secured, directly connected, or otherwise fluidly connected to a fourth connection 140. The fourth connection 140 may comprise a pipe or a duct. The fourth connection 140 may be fastened, secured, directly connected, or otherwise fluidly connected to a dryer 142 that further dries the fluid or compressed air. The dryer 142 may be fastened, secured, directly connected, or otherwise fluidly connected to a fifth connection 150. The fifth connection 150 may comprise a pipe or a duct. Along the fifth connection 150, a first valve 152 and a second valve 154 may control or restrict a flow of the fluid or the compressed air. In some embodiments, the first valve 152 and the second valve 154 may comprise check valves. In some embodiments, the first valve 152 and the second valve 154 may be electronically controlled. At an end of the fifth connection 150, a nozzle 156 may direct the fluid or the compressed air towards a sensor 160 to be cleaned. The pressure of the fluid or the compressed air leaving the nozzle 156 may be a discharge pressure $p_e$. The sensor cleaning apparatus 100 may be implemented as part of a vehicle 170, as shown in FIG. 1C.

In some embodiments, the computing system 103 may control the first valve 152 based on the pressure $p_r$ inside the reservoir 122. In some embodiments, the discharge pressure $p_e$ may be lower than $p_r$ due to a pressure loss from the reservoir 122 to the nozzle 156. The computing system 103 may determine a threshold value or range of values of the discharge pressure $p_e$, indicating a minimum amount of pressure, a maximum amount of pressure, and/or a range of pressures for sensor cleaning operations. For example, the computing system 103 may determine that sensor cleaning operations can be safely and effectively done with an absolute pressure range of 2 to 10 atmospheres in absolute pressure. From the threshold value or range of values of the discharge pressure $p_e$, the computing system 103 may determine a corresponding threshold value or range of values of $p_r$ by taking into account actual or expected pressure losses as the compressed air or the fluid is transported from the reservoir 122 to the nozzle 156. For example, the computing system 103 may determine that the corresponding range of values of $p_r$ is between 2.5 and 12.5 atmospheres in absolute pressure, based on a 20% pressure loss at a given temperature of the compressed air or the fluid from the reservoir 122 to the nozzle 156. In some examples, if the current pressure $p_r$ satisfies the threshold value or range of values of $p_r$, the computing system 103 may control the first valve 152 to allow the fluid or the compressed air to go through the fifth connection 150 towards the nozzle 156. If the current pressure $p_r$ fails to satisfy the threshold value or range of values of $p_r$, the computing system 103 may control the first valve 152 to block the fluid or the compressed air to prevent the fluid or the compressed air from travelling through the fifth connection 150 towards the nozzle 156. For example, if the current pressure $p_r$ is outside the range of 2.5 and 12.5 atmospheres in absolute pressure, the computing system 103 may control the first valve 152 to block a flow of the fluid or compressed air through the fifth connection 150 and prevent the fluid or the compressed air from exiting at the nozzle 156. In some embodiments, the computing system 103 may control the first valve 152 to always be open and permit fluid or compressed air to flow through the fifth connection 150.

In some embodiments, the computing system 103 may control an operation of the second valve 154 based on a condition of the sensor 160. The condition of the sensor 160 may comprise a concentration of one or more foreign substances, such as any of dirt, dust, or moisture, on the sensor 160. In some examples, the condition of the sensor 160 may comprise a dust particle concentration in air surrounding the sensor 160, within a threshold distance of the sensor 160, such as a distance within 10 meters of the sensor 160. In some examples, the condition of the sensor 160 may comprise a distribution of dust particle sizes. In some examples, the condition of the sensor 160 may comprise an air quality in the air surrounding the sensor 160. In some examples, a dust sensor 159 positioned at the nozzle 156 may determine the dust particle concentration in the surrounding air, and the distribution of dust particle sizes. The dust sensor 159 may comprise an infrared light emitting diode and a photosensor, which may detect the reflected infrared light emitting diode light due to dust particles in air.

If the condition of the sensor 160 indicates that the sensor 160 requires cleaning, for example, if a concentration of one or more foreign substances such as dust satisfies a threshold concentration, the computing system 103 may control the second valve 154 to allow the fluid or the compressed air to go through the fifth connection 150 towards the nozzle 156. In some examples, if the average dust particle size satisfies a threshold size, the computing system 103 may control the second valve 154 to allow the fluid or the compressed air to go through the fifth connection 150 towards the nozzle 156. In some examples, if the air quality index is higher than a threshold index, the computing system 103 may control the second valve 154 to allow the fluid or the compressed air to go through the fifth connection 150 towards the nozzle 156. If the condition of the sensor 160 indicates that the sensor 160 does not require cleaning, for example, if a concentration of one or more foreign substances such as dust falls short of a threshold concentration, the computing system 103 may control the second valve 154 to block the fluid or the compressed air to prevent the fluid or the compressed air from travelling through the fifth connection 150 towards the nozzle 156. In some examples, if the average dust particle size falls short of a threshold size, the computing system 103 may control the second valve 154 to block the fluid or the compressed air to prevent the fluid or the compressed air from travelling through the fifth connection 150 towards the nozzle 156. In some examples, if the air quality index is less than or equal to a threshold index, the computing system 103 may control the second valve 154 to block the fluid or the compressed air to prevent the fluid or the compressed air from travelling through the fifth connection 150 towards the nozzle 156. In some examples, the computing system 103 may control the second valve 154 to always permit the fluid or the compressed air to pass to the nozzle 156. In some examples, the computing system 103 may control the second valve 154 to permit the fluid or the compressed air to pass to the nozzle as long as the sensor 160 requires cleaning, for example, if the concentration of one or more foreign substances satisfies the threshold concentration, and once the sensor 160 does not require cleaning, for example, if the concentration of the one or more foreign substances no longer satisfies the threshold concentration, the computing system 103 may control the second valve 154 to block the fluid or the compressed air and prevent the fluid or compressed air from exiting the nozzle 156.

In some embodiments, the computing system 103 may control an operation of the second valve 154 based on a traffic condition and/or a road condition. In some examples, if a traffic condition and/or a road condition requires use of the sensor 160, the computing system may control the second valve 154 to block the fluid or the compressed air and prevent the fluid or compressed air from exiting the nozzle 156, in order to prevent the cleaning of the sensor 160. In some examples, the computing system 103 may determine an amount, concentration, or distribution of traffic, and determine whether or not to close off a flow of the fluid or the compressed air through the second valve 154, based on the amount, concentration, or distribution of traffic and/or predicted traffic. For example, if a level of traffic is currently or is predicted to be heavy, the computing system 103 may determine to close off the flow through the second valve 154. In another example, if a road has a high concentration of bumps, or obstacles, or has a high slope, or a weather condition is inclement, the computing system 103 may determine to close off the flow through the second valve 154.

In some embodiments, the computing system 103 may control an operation of the compressor 102 based on any of: a current velocity of the vehicle 170, a current velocity of one or more other vehicles near the vehicle 170 within a threshold distance of the vehicle 170, a traffic signal, a future predicted velocity of the vehicle 170, a desired or preset frequency of cleaning of the sensor 160 and/or other sensors, a current acceleration of the vehicle 170, a future acceleration of the vehicle 170, or an amount of traffic. In some embodiments, the operation of the compressor 102 may be based on an operating pressure range, also known as an operating range of pressures, of the compressor 102. The operating pressure range of the compressor 102 may be a range of pressures of $p_r$ inside the reservoir 122 during which the compressor 102 is turned on to generate the fluid or compressed air. For example, if the operating pressure range of the compressor 102 is between 1 atmosphere and 10 atmospheres in absolute pressure, the compressor 102 may be turned on if the pressure $p_r$ inside the reservoir 122 is between 1 atmosphere and 10 atmospheres, but the compressor 102 may be turned off if the pressure $p_r$ inside the reservoir 122 is outside the operating pressure range of between 1 atmosphere and 10 atmospheres in absolute pressure. In some embodiments, the computing system 103 may, as the pressure $p_r$ inside the reservoir 122 decreases, keep the compressor 102 off until the pressure $p_r$ inside the reservoir 122 reaches a cutoff pressure. For example, the computing system 103 may keep the compressor 102 off even as the pressure $p_r$ inside the reservoir 122 decreases below 10 atmospheres absolute pressure, until the pressure $p_r$ inside the reservoir 122 reaches a cutoff pressure of, for example, 2 atmospheres, and then turn on the compressor 102. In this manner, the computing system 103 may ensure at least a residual supply of fluid or compressed air inside the reservoir 122.

In some embodiments, the operating range of pressures of $p_r$ inside the reservoir 122, over which the compressor 102 operates, may be determined or changed based on any of, or a combination of, a current velocity of the vehicle 170, a current velocity of one or more other vehicles near the vehicle 170, the current pressure $p_r$, a traffic signal, a future predicted velocity of the vehicle 170 or other nearby vehicles, a desired or preset frequency of cleaning of the sensor 160 and/or other sensors, a current acceleration of the vehicle 170 or of other nearby vehicles, a predicted future acceleration of the vehicle 170 or of other vehicles, or an amount of traffic. In some examples, if the vehicle 170 is in an idle state or an engine off state, the operating range of pressures of $p_r$ inside the reservoir 122, over which the compressor 102 operates, may be adjusted to be narrower compared to the operating range of pressures of $p_r$ inside the reservoir 122 if the vehicle 170 were actually driving. For example, if the vehicle 170 were in an idle state or an engine off state, the operating range of pressures of $p_r$ inside the reservoir 122 may only be from 1 atmosphere to 5 atmospheres absolute pressure compared to 1 atmosphere to 10 atmospheres absolute pressure in the scenario in which the vehicle 170 were actually driving. Additionally, the cutoff pressure of $p_r$ may be 1.5 atmospheres if the vehicle 170 were in an idle state or an engine off state compared 2 atmospheres in the scenario in which the vehicle 170 were actually driving. Thus, the computing system 103 may wait until the pressure $p_r$ inside the reservoir 122 drops to 1.5 atmospheres before actually turning on the compressor 102. Therefore, when the vehicle 170 is idle, has its engine off, or is otherwise not operating, the computing system 103 may control the compressor 102 to operate less frequently and generate less noise. In some embodiments, the computing system 103 may predict a specific time at which the vehicle 170 switches from an engine off state and turns on the engine, or when the vehicle 170 switches from the idle state to a driving state, for example, when a traffic light turns from red to green, or after the vehicle restarts following a stop sign. The computing system 103 may synchronize the predicted time of the switch from the engine off state or from the idle state with an adjustment of the operating pressure range of the compressor 102. For example, the computing system 103 may adjust the operating pressure range of the compressor 102 at a same time as the predicted time of the switch. For example, if the predicted time of the switch is at 10:00 AM GMT, the computing system 103 may adjust the operating pressure range of the compressor 102 by widening the operating range of pressures of $p_r$ at the same time as the predicted time of the switch. For example, the operating pressure range of the compressor 102 may be widened from a range between 1 atmosphere and 5 atmospheres absolute pressure to a range between 1 atmosphere and 8 atmospheres absolute pressure.

In some embodiments, an increase in a velocity of the vehicle 170, and/or an increase in a frequency of engine rotation of the vehicle 170, may cause or result in the computing system 103 widening the operating range of pressures of $p_r$ inside the reservoir 122 over which the compressor 102 operates. For example, if the current velocity of the vehicle 170 is 70 miles per hour, the operating range of pressures of $p_r$ inside the reservoir 122 over which the compressor 102 operates may be 1 atmosphere to 7 atmospheres absolute pressure. If the velocity of the vehicle 170 increases to 80 miles per hour, the operating range of pressures of $p_r$ inside the reservoir 122 over which the compressor 102 operates may be 1 atmosphere to 8 atmospheres absolute pressure. If the velocity of the vehicle 170 decreases to 60 miles per hour, the operating range of pressures of $p_r$ inside the reservoir 122 over which the compressor 102 operates may be 1 atmosphere to 6 atmospheres absolute pressure. In some embodiments, in response to the velocity of the vehicle 170 increasing, the cutoff pressure may also increase, for example, from 2.1 atmospheres to 2.4 atmospheres absolute pressure. In some embodiments, an upper bound of the operating range of pressures of $p_r$ inside the reservoir 122, in absolute pressure, may be proportional to the current velocity of the vehicle 170 or the frequency of engine rotation of the vehicle 170, in revolutions per minute (RPM), while a lower bound of the operating range of pressures of $p_r$ inside the reservoir 122 may be kept constant over all predicted future velocities or predicted frequencies of engine rotation. The cutoff pressure may be regulated in a correlated manner with the upper bound of the operating range. Thus, in response to the upper bound of the operating range increasing, the cutoff pressure may also increase. An amount of increase of the cutoff pressure may be proportional to an amount of increase of the upper bound of the operating range. For example, if the upper bound of the operating range increases from 7 atmospheres absolute pressure to 8 atmospheres absolute pressure, the cutoff pressure may increase from 2.1 atmospheres absolute pressure to 2.4 atmospheres absolute pressure. A relationship between the velocity of the vehicle 170, the operating pressure range of the compressor 102, and the cutoff pressure of the compressor 102, is shown and further described with respect to FIG. 1D.

In other embodiments, an increase in a velocity of the vehicle 170, and/or an increase in a frequency of engine rotation of the vehicle 170, may cause or result in the computing system 103 narrowing the operating range of pressures of $p_r$ inside the reservoir 122 over which the compressor 102 operates.

In other embodiments, in response to a velocity of the vehicle 170 decreasing, or in response to the predicted frequency of engine rotation of the vehicle 170 decreasing, the computing system 103 may widen the operating range of pressures of $p_r$ inside the reservoir 122 over which the compressor 102 operates. This widening of the operating range of pressures may provide additional fluid or compressed air in the reservoir 122 so that if cleaning of the sensor 160 is required when the vehicle 170 is travelling at a lower speed or experiencing an idle state or engine off state, the compressor 102 does not need to be turned on. Additionally, the computing system 103 may harness or divert energy from braking to the compressor 102. For example, the computing system 103 may control the slow down the vehicle 170 using regenerative braking to convert a kinetic energy of the movement of the vehicle 170 into energy for the compressor 102 to generate the fluid or compressed air. In some examples, the computing system 103 may control the conversion of the kinetic energy, using a motor, into battery power, which may be converted into energy for the compressor 102. In some examples, the computing system 103 may control the conversion of the kinetic energy using a hydraulic motor to store energy as compressed air, which may be fed directly to the reservoir 122.

In some embodiments, in response to the velocity of the vehicle 170 decreasing, or in response to the predicted frequency of engine rotation of the vehicle 170 decreasing, the cutoff pressure may also increase, for example, from 2.1 atmospheres to 2.4 atmospheres.

In some examples, in response to the velocity of the vehicle 170 decreasing, an upper bound of the operating range of pressures of $p_r$ inside the reservoir 122, in absolute pressure, may increase, while a lower bound of the operating range of pressures of $p_r$ may be kept constant. The upper bound may be inversely proportional to the velocity of the vehicle 170, in some examples. In some examples, the lower bound of the operating range may also decrease in response to the decrease in the predicted future velocity of the vehicle 170. For example, if the velocity of the vehicle has decreased from 50 miles per hour to 25 miles per hour, the operating range of pressures of $p_r$ inside the reservoir 122 may change from 1-5 atmospheres absolute pressure to 0.5-10 atmospheres absolute pressure. In such a scenario, an original lower bound may be 1 atmosphere absolute pressure, an original upper bound may be 5 atmospheres absolute pressure, an updated lower bound may be 0.5 atmospheres absolute pressure, and an updated upper bound may be 10 atmospheres absolute pressure. The cutoff pressure may be regulated in a correlated manner with the upper bound of the operating range. Thus, in response to the upper bound of the operating range increasing, the cutoff pressure may also increase. An amount of increase of the cutoff pressure may be proportional to an amount of increase of the upper bound of the operating range.

In other embodiments, the computing system 103 may adjust the operating range of the compressor 102 to be widened in response to the vehicle 170 slowing down, but once the vehicle 170 reaches a threshold velocity while slowing down, the computing system 103 may adjust the operating range of the compressor 102 to be narrowed in response to the vehicle 170 slowing down. For example, if a velocity of the vehicle 170 dips to below the threshold velocity, such as 25 miles per hour, the operating range of the compressor may be narrowed as the vehicle 170 slows down further.

Similarly, the computing system 103 may adjust the operating range of pressures of $p_r$ inside the reservoir 122 over which the compressor 102 operates, as a function of a future or predicted trajectory of the vehicle. A change in a planned trajectory of the vehicle 170 due to traffic, traffic signs, road conditions, detours, or a route, may cause or result in a change in the operating range of the compressor 102. The computing system 103 may dynamically change the operating range of the compressor 102 based on the change in the planned trajectory of the vehicle 170. In some examples, an increase in a predicted future velocity of the vehicle 170, and/or an increase in a predicted future frequency of engine rotation of the vehicle 170, may cause or result in the computing system 103 widening the operating range of pressures of $p_r$ inside the reservoir 122 over which the compressor 102 operates. In some embodiments, in response to the predicted velocity of the vehicle 170 increasing, or in response to the predicted frequency of engine rotation of the vehicle 170 increasing, the cutoff pressure may also increase, for example, from 2.1 atmospheres to 2.4 atmospheres. In some examples, an upper bound of the operating range of pressures of $p_r$ inside the reservoir 122, in absolute pressure, may be proportional to the predicted future velocity of the vehicle 170 or the predicted frequency of engine rotation of the vehicle 170, while a lower bound of the operating range of pressures of $p_r$ may be kept constant over all predicted future velocities or predicted frequencies of engine rotation.

In other examples, on the other hand, an increase in a predicted future velocity of the vehicle 170, and/or an increase in a predicted future frequency of engine rotation of the vehicle 170, may cause or result in a narrowing in the operating range of pressures of $p_r$ inside the reservoir 122 over which the compressor 102 operates. Because the computing system 103 may anticipate that the velocity of the vehicle 170 may increase, which may result in a future increase in a noise level caused by an engine of the vehicle 170, the computing system 103 may control the compressor 102 to operate more frequently when the velocity of the vehicle 170 actually increases and less frequently before the velocity of the vehicle 170 actually increases. The computing system 103 may widen the operating range of pressures of $p_r$ inside the reservoir 122 once the velocity of the vehicle 170 actually increases, but narrow the operating range of pressures of $p_r$ before the velocity of the vehicle 170 increases. The cutoff pressure may be regulated in a correlated manner with the upper bound of the operating range. Thus, in response to the upper bound of the operating range increasing, the cutoff pressure may also increase. An amount of increase of the cutoff pressure may be proportional to an amount of increase of the upper bound of the operating range.

Meanwhile, a decrease in a predicted future velocity of the vehicle 170, and/or an decrease in a predicted future frequency of engine rotation of the vehicle 170, may cause or result in the computing system 103 widening the operating range of pressures of $p_r$ inside the reservoir 122 over which the compressor 102 operates. This widening of the operating range of pressures may provide additional fluid or compressed air in the reservoir 122 so that if cleaning of the sensor 160 is required when the vehicle 170 is predicted to be travelling at a lower speed or predicted to experience an idle state or engine off state, the compressor 102 does not need to be turned on. In some embodiments, in response to the predicted velocity of the vehicle 170 decreasing, or in response to the predicted frequency of engine rotation of the vehicle 170 decreasing, the cutoff pressure may also increase, for example, from 2.1 atmospheres to 2.4 atmospheres.

In some examples, in response to a decrease in the predicted future velocity of the vehicle 170, an upper bound of the operating range of pressures of $p_r$ inside the reservoir 122, in absolute pressure, may increase, while a lower bound of the operating range of pressures of $p_r$ may be kept constant over any predicted future velocities or predicted frequencies of engine rotation. The upper bound may be inversely proportional to the predicted future velocity of the vehicle 170, in some examples. In some examples, the lower bound of the operating range may also decrease in response to the decrease in the predicted future velocity of the vehicle 170. For example, if the future velocity of the vehicle is predicted to decrease from 50 miles per hour to 25 miles per hour, the operating range of pressures of $p_r$ inside the reservoir 122 may change from 1-5 atmospheres absolute pressure to 0.5-10 atmospheres absolute pressure. In such a scenario, an original lower bound may be 1 atmosphere absolute pressure, an original upper bound may be 5 atmospheres absolute pressure, an updated lower bound may be 0.5 atmospheres absolute pressure, and an updated upper bound may be 10 atmospheres absolute pressure. The cutoff pressure may be regulated in a correlated manner with the upper bound of the operating range. Thus, in response to the upper bound of the operating range increasing, the cutoff pressure may also increase. An amount of increase of the cutoff pressure may be proportional to an amount of increase of the upper bound of the operating range.

The cutoff pressure may be regulated in a correlated manner with the upper bound of the operating range. Thus, in response to the upper bound of the operating range increasing, the cutoff pressure may also increase. An amount of increase of the cutoff pressure may be proportional to an amount of increase of the upper bound of the operating range.

In some embodiments, an increase in an acceleration or a predicted future acceleration of the vehicle 170, may cause or result in the computing system 103 widening the operating range of pressures of $p_r$ inside the reservoir 122 over which the compressor 102 operates. A decrease in the acceleration or the predicted future acceleration of the vehicle 170 may cause or result in the computing system 103 narrowing the operating range of pressures of $p_r$ inside the reservoir 122 over which the compressor 102 operates. In some embodiments, in response to the acceleration or the predicted acceleration of the vehicle 170 increasing, the computing system 103 may further increase the cutoff pressure, for example, from 2.1 atmospheres to 2.4 atmospheres. The amount of increase in the cutoff pressure may be proportional to the increase of the upper bound of the operating range of pressures of $p_r$.

In other embodiments, in response to the predicted acceleration of the vehicle 170 decreasing, an upper bound of the operating range of pressures of $p_r$ inside the reservoir 122, in absolute pressure, may increase, while a lower bound of the operating range of pressures of $p_r$ may be kept constant over any predicted future velocities or predicted frequencies of engine rotation. In some examples, the lower bound of the operating range may also decrease in response to the decrease in the predicted future acceleration of the vehicle 170. For example, if the future acceleration of the vehicle is predicted to decrease from 0 miles per hour to negative 5 miles per hour (e.g., the vehicle is predicted to decelerate), the operating range of pressures of $p_r$ inside the reservoir 122 may change from 1-5 atmospheres absolute pressure to 0.5-10 atmospheres absolute pressure. In such a scenario, an original lower bound may be 1 atmosphere absolute pressure, an original upper bound may be 5 atmospheres absolute pressure, an updated lower bound may be 0.5 atmospheres absolute pressure, and an updated upper bound may be 10 atmospheres absolute pressure. The cutoff pressure may be regulated in a correlated manner with the upper bound of the operating range. Thus, in response to the upper bound of the operating range increasing, the cutoff pressure may also increase. An amount of increase of the cutoff pressure may be proportional to an amount of increase of the upper bound of the operating range.

In some embodiments, the controlling the operation of the compressor 102 comprises determining an operating pressure range of the compressor 102 based on a traffic sign or signal. For example, if the vehicle 170 is approaching a red light or stop sign ahead, the computing system 103 may widen the operating range of pressures of $p_r$ inside the reservoir 122 because the vehicle 170 is anticipated to slow down. In some examples, if the vehicle 170 is approaching a traffic light ahead and the vehicle 170 is anticipated to speed up, the computing system 103 may narrow the operating range of pressures of $p_r$. In some examples, the computing system 103 may determine an amount, concentration, or distribution of traffic, and determine an operating pressure range of the compressor 102 based on the amount, concentration, or distribution of traffic and/or predicted traffic. For example, if the traffic is predicted to increase, the computing system 103 may narrow the operating range of pressures of $p_r$ in order to reduce a frequency of operation of the compressor 102 and resulting noise. Additionally, the computing system 103 may reduce a frequency of cleaning the one or more sensors including the sensor 160 in conditions of higher traffic in order to prevent interference with a usage of the one or more sensors. In other examples, the computing system 103 may narrow the operating range of pressures of $p_r$ in response to harsh road conditions such as bumps, high slope, and/or a concentration of obstacles on a road, because sensor cleaning may not take place during such harsh road conditions in order to prevent interference with a usage of the one or more sensors. In other examples, the computing system 103 may clean sensors such as the sensor 160 in response to harsh road conditions or heavy traffic, only if the sensors to be cleaned have other redundant operational sensors, and/or not clean redundant sensors simultaneously, but rather, space out a cleaning of the redundant sensors over time.

In some embodiments, the computing system 103 may adjust control of the compressor 102, including the operating range of the compressor 102, based on a weather condition and/or a background noise. In some examples, in response to an increasing level of precipitation, the computing system 103 may widen the operating range of the compressor 102 because a frequency of cleaning the sensors such as the sensor 160 may increase, in order to remove precipitation that otherwise may obstruct the sensors. Additionally, in response to an increasing level of background noise, the computing system 103 may widen the operating range of the compressor 102 because the noise produced by the compressor 102 may be drowned out by the background noise. In some embodiments, the level of background noise may be determined by the microphone, for example, determining the level of background noise when the compressor 102 is turned off. In some embodiments, the computing system 103 may adjust the operating range of the compressor 102 based on a rotation speed of a windshield wiper. In some examples, the computing system 103 may widen the operating range of the compressor 102 in response to the rotation speed of the windshield wiper increasing, and narrow the operating range of the compressor 102 in response to the rotation speed of the windshield wiper decreasing. In some embodiments, the computing system 103 may determine an operating range of the compressor 102 based on an air quality index (AQI). For example, as the AQI increases, the computing system may narrow the operating range of the compressor 102 to lower an amount of unclean air from entering into the compressor 102.

FIG. 1B illustrates an aftercooler 162, which may be implemented as the aftercooler 112 of FIG. 1A, associated with the sensor cleaning apparatus 100 in accordance with an example embodiment of the present disclosure. The aftercooler 162 may comprise an inlet 163 through which the fluid or compressed air enters, a heat exchanger 164 over which cooling air or cooling fluid cools the fluid or compressed air, a moisture separator 165 that mechanically separates most or all of liquid moisture condensed from, and solids from the compressed air, a moisture drain 166 that removes the moisture and solids, and an outlet 167 through which the fluid or compressed air exits.

FIG. 1C illustrates the vehicle 170 associated with the sensor cleaning apparatus in accordance with an example embodiment of the present disclosure. In some embodiments, the vehicle 170 may comprise a shock absorber 172, a control arm 174, a steering linkage 176, a subframe 178 that supports an engine and body of the vehicle, and to which a compressor such as the compressor 102 may be connected or mounted.

FIG. 1D illustrates an example of a relationship 180 that illustrates an example operation of a compressor such as the compressor 102 of FIG. 1A of the sensor cleaning apparatus 100, as controlled by a computing system such as the computing system 103. In FIG. 1D, the relationship between the velocity of a vehicle such as the vehicle 170 of FIG. 1C, the operating pressure range, and the cutoff pressure, as also described with reference to FIG. 1A, is shown. In FIG. 1D, a velocity 182 of the vehicle 170, an operating range 184 of pressures of $p_r$ inside the reservoir 122 over which the compressor 102 operates or is actively generating compressed air or fluid, and a cutoff pressure 186 is shown. In response to an increase in the velocity 182, an upper bound of the operating range 184 and the cutoff pressure 186 may also increase. In response to a decrease in the velocity 182, an upper bound of the operating range 184 and the cutoff pressure 186 may also decrease.

FIG. 1E illustrates an exemplary operation of the computing system 103, in which the computing system 103 acquires information of individual frequency components of a noise associated with the compressor 102 using a Fourier transform 188.

Figure 1F:
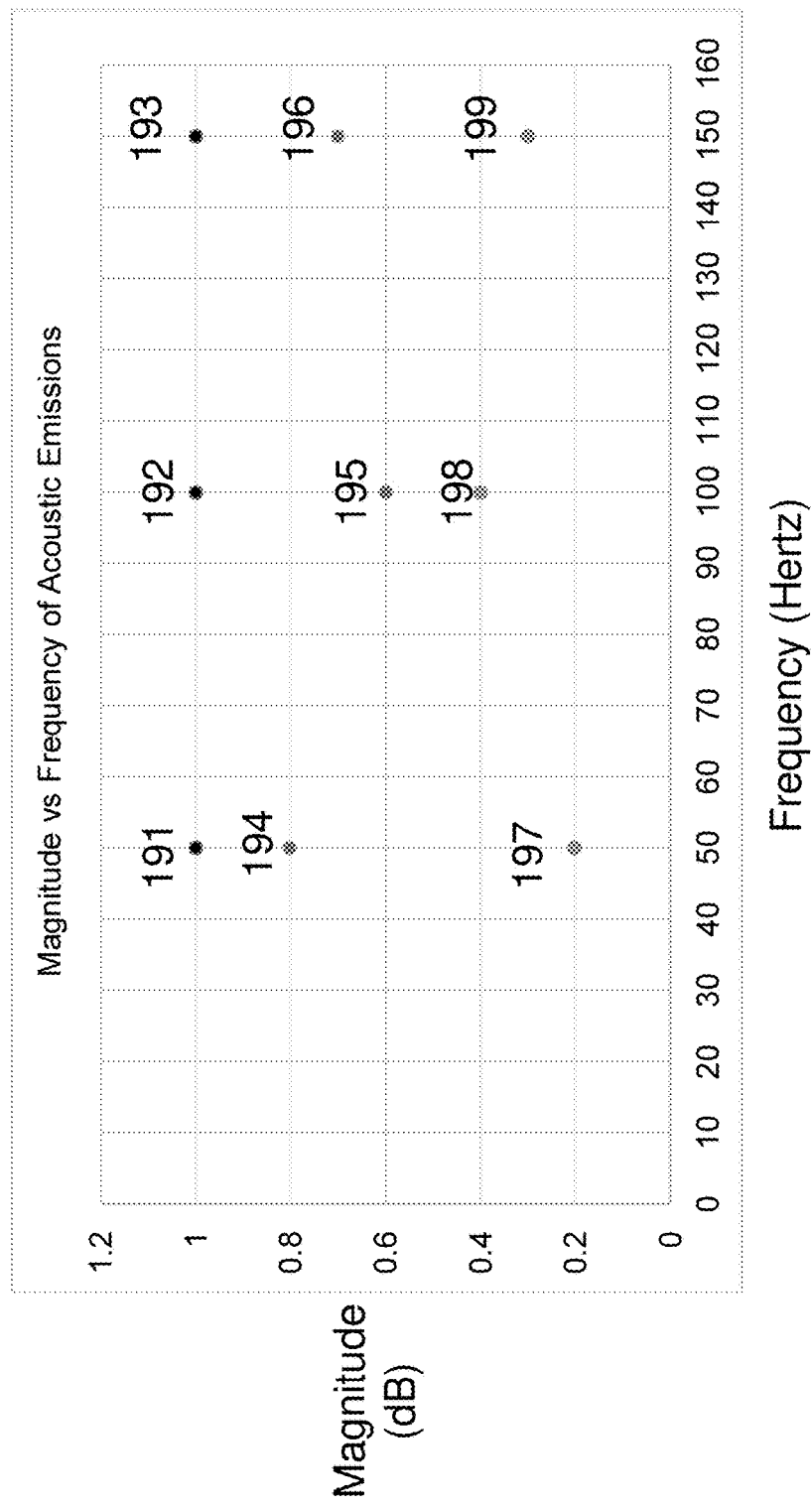
FIG. 1F illustrates an exemplary operation of a computing system of the sensor cleaning apparatus.

FIG. 1F illustrates an exemplary operation of the computing system 103, in which the computing system 103 compensates an acoustic emission generated by the compressor 102 using an acoustic emission generated independently of the compressor 102. FIG. 1F depicts a relationship 190 of magnitudes with respect to different frequencies of acoustic emissions. Points 191, 192, and 193 indicate data of acoustic emissions, for example, captured at a particular location, such as by the microphone 104, when the compressor 102 is running at a particular speed. Point 191 indicates that a magnitude in dB of the acoustic emission is 1 dB at a frequency of 50 Hz. Point 192 indicates that a magnitude in dB of the acoustic emission is 1 dB at a frequency of 100 Hz. Point 193 indicates that a magnitude in dB of the acoustic emission is 1 dB at a frequency of 150 Hz.

Points 194, 195, and 196 indicate data of second acoustic emissions which are generated independently of the compressor 102. In some examples, this data of the second acoustic emissions may be obtained at the same particular location, when the compressor 102 is turned off and not operating. In other words, the speed of the compressor 102 is zero, and the compressor 102 is not generating fluid or compressed air, at the points 194, 195, and 196. Point 194 indicates that a magnitude in dB of the second acoustic emission is 0.8 dB at a frequency of 50 Hz. Point 195 indicates that a magnitude in dB of the second acoustic emission is 0.6 dB at a frequency of 100 Hz. Point 196 indicates that a magnitude in dB of the second acoustic emission is 0.7 dB at a frequency of 150 Hz.

Points 197, 198, and 199 indicate data of acoustic emissions compensated to account for second acoustic emissions generated independently from the compressor 102. In some examples, the compensated data is obtained by subtracting, at each of the frequencies 50 Hz, 100 Hz, and 150 Hz, a corresponding magnitude of the second acoustic emissions, from the each of the magnitudes of the acoustic emissions. For example, at 50 Hz, the magnitude of the acoustic emission is 1 dB while the magnitude of the second acoustic emission is 0.8 dB. Thus, the compensated magnitude, indicated by point 197, is 0.2 dB. This magnitude of 0.2 dB removes the effects of acoustic emissions of 50 Hz that are generated independently from the compressor 102. Likewise, at 100 Hz, the magnitude of the acoustic emission is 1 dB while the magnitude of the second acoustic emission is 0.6 dB. Thus, the compensated magnitude, indicated by point 198, is 0.4 dB. This magnitude of 0.4 dB removes the effects of acoustic emissions of 100 Hz that are generated independently from the compressor 102. Similarly, at 150 Hz, the magnitude of the acoustic emission is 1 dB while the magnitude of the second acoustic emission is 0.7 dB. Thus, the compensated magnitude, indicated by point 198, is 0.3 dB. This magnitude of 0.3 dB removes the effects of acoustic emissions of 150 Hz that are generated independently from the compressor 102.

Figure 2:
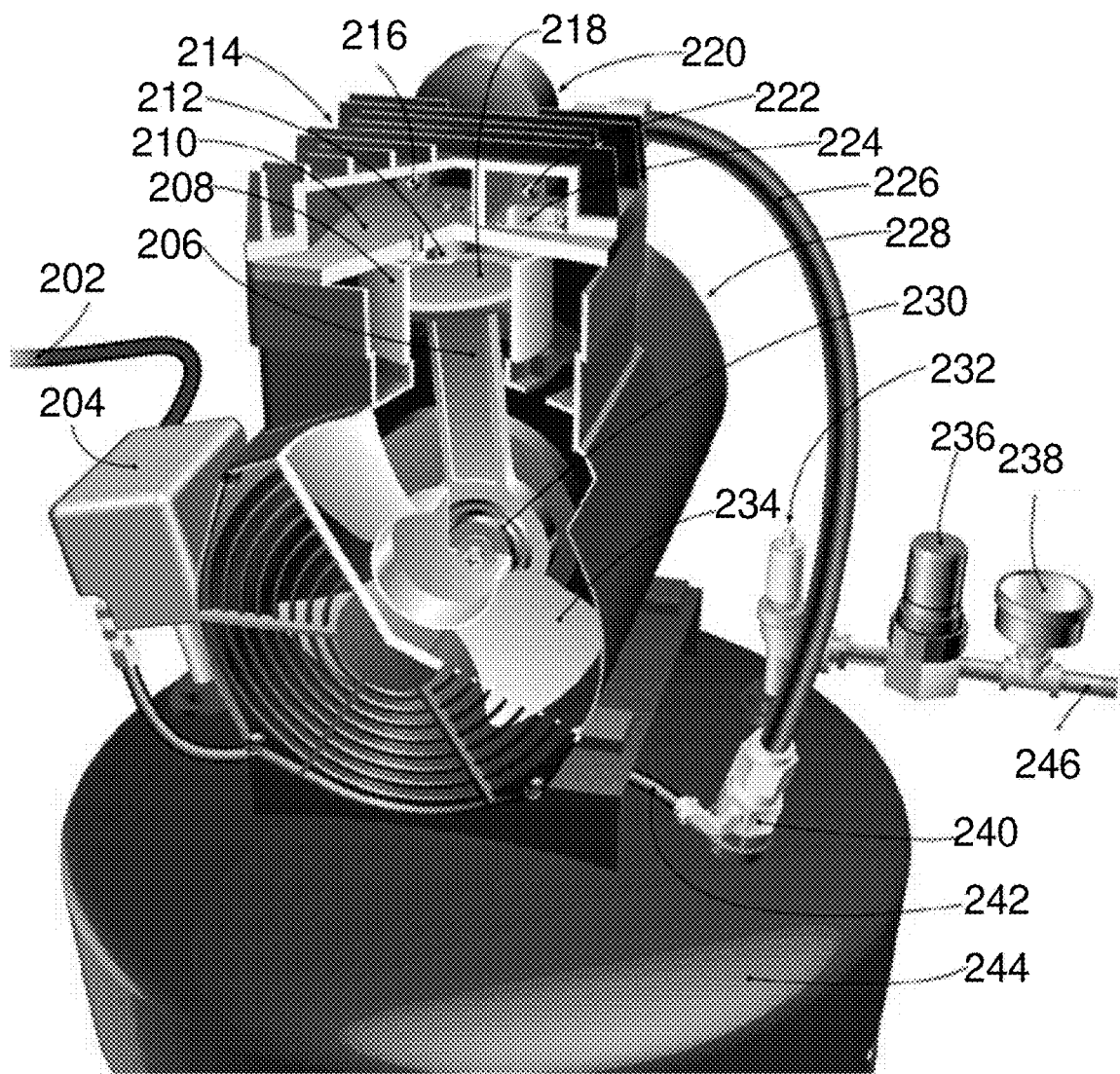
FIG. 2 illustrates a compressor of the sensor cleaning apparatus in accordance with an example embodiment of the present disclosure.

FIG. 2 illustrates a compressor 200, which may be implemented as the compressor 102 of FIG. 1A, of the sensor cleaning apparatus 100, in accordance with an example embodiment of the present disclosure. In some embodiments, the compressor 200 may comprise a reciprocating compressor. The compressor 200 may comprise a power connection line 202, a pressure switch 204, a rod 206, a piston sleeve 208, a valve plate 210, an inlet valve 212, cooling fins 214, an inlet port 216, a piston 218, an air filter 220, a discharge port 222, a discharge valve 224, a discharge tube 226, a housing 228, a bearing 230, a safety valve 232, a fan 234, a regulator 236, a gauge 238, a check valve 240, an unloader tube 242, a storage tank 244, and a tube 246 through which air flows in. In some embodiments, the pressure switch 204 may be controlled by the computing system 103 of FIG. 1A based on the pressure $p_r$ inside the reservoir 122 of FIG. 1A, and/or based on an internal pressure inside the compressor 102.

Figure 3:
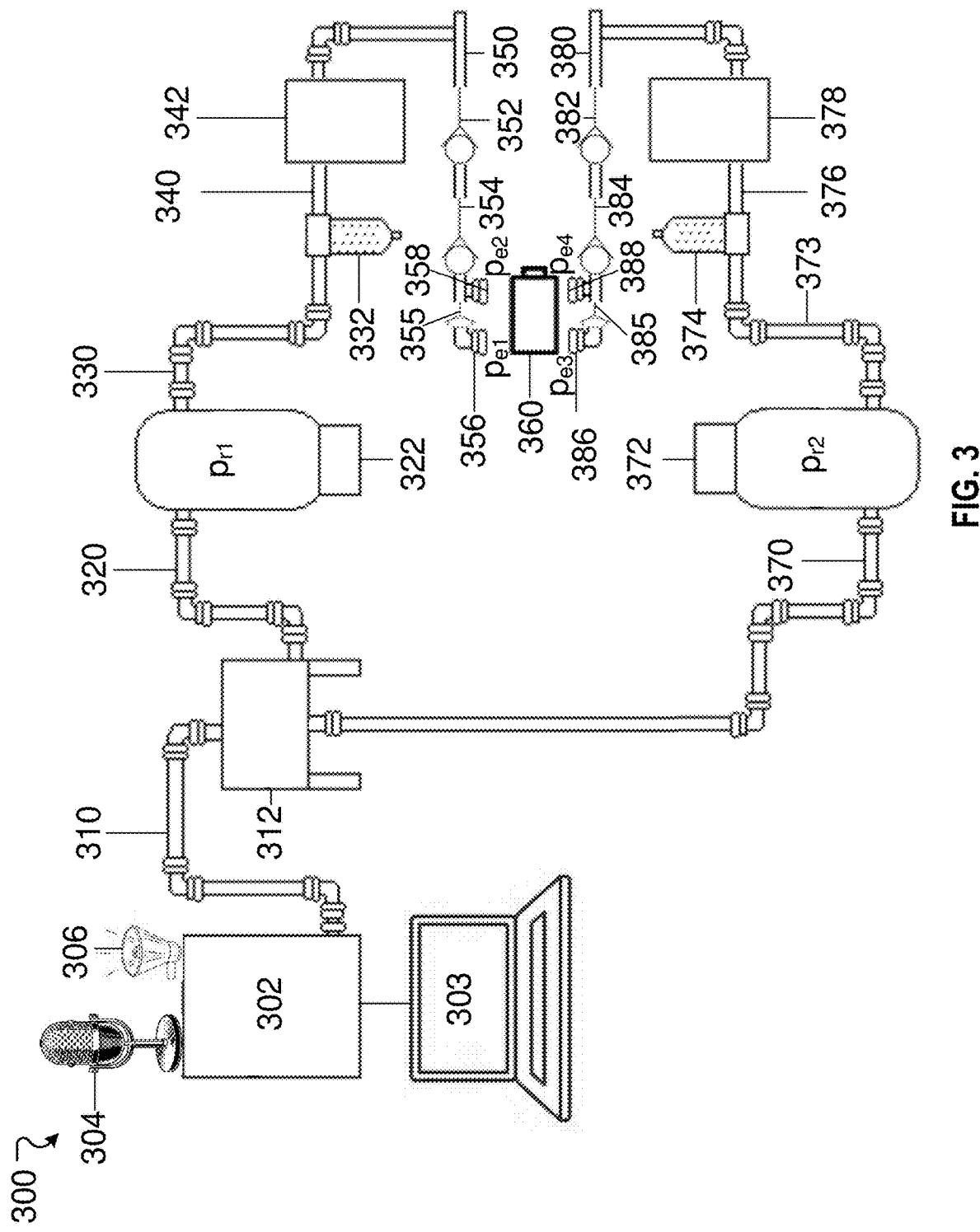
FIG. 3 illustrates a sensor cleaning apparatus in accordance with an example embodiment of the present disclosure.

FIG. 3 illustrates a sensor cleaning apparatus 300 that provides different nozzles, each having different pressures of fluids or compressed air, to clean a sensor. The descriptions of the sensor cleaning apparatus 100 in FIG. 1A may also apply to the sensor cleaning apparatus 300. The sensor cleaning apparatus 300 may be implemented as part of the vehicle 170 of FIG. 1C. The sensor cleaning apparatus 300 may comprise a compressor 302 and a computing system 303 that controls operations of the compressor 302 and/or other related components described below. The computing system 303 may comprise one or more processors. The compressor 302 may be configured to generate a fluid such as compressed air. An absolute pressure of the generated compressed air may be between 2 atmospheres and 100 atmospheres in absolute pressure. At a base of the compressor 302 may be a base pan with additional plates to provide structural impedance to reduce noise. In some embodiments, the sensor cleaning apparatus 300 may further include noise cancellation mechanisms to specifically cancel out or reduce noise generated by the compressor 302. Other similar noise cancellation mechanisms to address noise generated by other components or operations of the sensor cleaning apparatus 300 and/or a vehicle on which the sensor cleaning apparatus is being implemented may be disposed elsewhere. In some embodiments, the sensor cleaning apparatus 300 may further comprise a microphone 304 and a speaker 306. The microphone 304 and the speaker 306 may be directly or indirectly connected to the compressor 302, and be located within a threshold distance of the compressor 302. The computing system 303 may acquire information, from the microphone 304, of one or more acoustic emissions of the compressor 302, which may include one or more frequencies of the acoustic emissions. The computing system 303 may associate or synchronize the information of the one or more frequencies with a current compressor speed information, which may include an operating or rotational speed of the compressor 302, to determine relationships between the compressor speed and respective frequencies of the acoustic emissions at different compressor speeds and/or different compressor operations. For example, at one operating speed of the compressor 302, such as 1000 revolutions per minute, a most common frequency of acoustic emissions may be 50 to 60 Hertz while at another operating speed such as 3000 revolutions per minute, a most common frequency of acoustic emissions may be 100 to 120 Hertz. The computing system 303 may convert the one or more acoustic emissions captured by the microphone 304 using a Fourier Transform such as a Fast Fourier Transform to acquire the individual spectral components and frequency information of the one or more acoustic emissions. The computing system 303 may also acquire information indicating magnitudes of respective frequencies associated with the one or more acoustic emissions in other manners. The computing system 303 may determine, at the different compressor speeds and/or operations, respective dominant frequencies of the captured acoustic emission.

At each operating speed of the compressor 302, the computing system 303 may subtract out the frequency information of the individual spectral components captured by the microphone 104 when the compressor 302 is off. For example, the computing system 303 may subtract the y-axis values indicating magnitudes or respective frequency components obtained using a Fourier transform when the compressor 302 is turned off, from the corresponding y-axis values when the compressor 302 is operating at a certain speed. Thus, information of acoustic emissions while the compressor 302 is off may also be acquired by the computing system 303 so that such frequencies when the compressor 302 is off may be used as a control or baseline to compensate for noise that is generated independent of the compressor 303. The computing system 303 may thus determine which frequencies of acoustic emissions are not generated by the compressor 302. Meanwhile, the computing system 303 may control the speaker 306 to generate an acoustic emission such as a noise of a same frequency or frequencies and an opposing phase or phases compared to that or those of the acoustic emissions resulting from the compressor 302, for example, including the noise detected using the microphone 304 and the computing system 303 after compensating for noise that is generated independent of the compressor 302. A magnitude of the generated acoustic emission may be approximately equal to or proportional to a magnitude of the compensated acoustic emission or the of the uncompensated acoustic emission at the frequency of frequencies. Alternatively, the speaker 306 may be disposed in a passenger cabin of the vehicle. The computing system 303 may further determine or predict times at which the compressor 302 will or may be turned on and at what operating speed the compressor 302 will operate at. The computing system 303 may control the speaker 306 to operate during the determined or predicted times, and compensate for the noise generated by the compressor 302 based on the operating speed of the compressor 302.

The sensor cleaning apparatus 300 may comprise multiple microphones and/or speakers. Each of the microphones may detect a particular range of frequencies and each speaker may output a particular range of frequencies. In some embodiments, the sensor cleaning apparatus 300 may further comprise a filter or resonator that reduces or eliminates an amount of noise from the compressor 302. Such embodiments are further described in reference to FIGS. 5-10, and may be used in conjunction with the microphone 304 to detect the particular frequencies specific to the compressor 302, and/or the speaker 306. The operations described in reference to FIGS. 5-10 may be controlled at least in part by the computing system 303, controlled separately from the computing system 303, and/or controlled by another set of processors. The sensor cleaning apparatus 300 may further comprise an absorptive muffler that absorbs waves of particular frequencies and/or a reactive muffler comprising lumped elements that reflects waves of particular frequencies.

Downstream of the compressor 302, a first connection 310 may be fastened, secured, directly connected, or otherwise fluidly connected to the compressor 302. The first connection 310 may comprise a pipe or a duct. The first connection 310 may be fastened, secured, directly connected, or otherwise fluidly connected to an aftercooler 312 that cools the air from the compressor 302. In some embodiments, the aftercooler 312 may comprise a spiral finned tube coil or a plate-fin coil with baffle plates and a motor-driven fan. In some examples, the aftercooler 312 may further comprise a moisture separator, that mechanically separates most or all of liquid moisture condensed from, and solids from the compressed air. In some examples, the baffle plates may utilize centrifugal force to accumulate the moisture and solids at a bottom of the moisture separator. In some examples, the aftercooler 312 may further comprise a drain may remove the moisture and solids.

The aftercooler 312 may be fastened, secured, directly connected, or otherwise fluidly connected to a second connection 320 of FIG. 1A. The second connection 320 may comprise a pipe or a duct. The second connection 320 may be fastened, secured, directly connected, or otherwise fluidly connected to a first reservoir 322 that stores an amount of the fluid such as the compressed air. The first reservoir 322 may store the fluid at a first pressure $p_{r1}$.

The first reservoir 322 may be fastened, secured, directly connected, or otherwise fluidly connected to a third connection 330. The third connection 330 may comprise a pipe or a duct. The third connection 330 may be fastened, secured, directly connected, or otherwise fluidly connected to a filter 332 that further filters dust and solid particulates from the fluid or compressed air. The filter 332 may be fastened, secured, directly connected, or otherwise fluidly connected to a fourth connection 340. The fourth connection 340 may comprise a pipe or a duct. The fourth connection 340 may be fastened, secured, directly connected, or otherwise fluidly connected to a dryer 342 that further dries the fluid or compressed air. The dryer 342 may be fastened, secured, directly connected, or otherwise fluidly connected to a fifth connection 350. The fifth connection 350 may comprise a pipe or a duct. Along the fifth connection 350, a first valve 352 and a second valve 354 may control or restrict a flow of the fluid or the compressed air. In some embodiments, the first valve 352 and the second valve 354 may comprise check valves. In some embodiments, the first valve 352 and the second valve 354 may be electronically controlled. At an end of the fifth connection 350, a first nozzle 356 may direct the fluid or the compressed air towards a sensor 360 to be cleaned, and a second nozzle 358 may also direct the fluid or the compressed air towards the sensor 360. The pressure of the fluid or the compressed air leaving the first nozzle 356 may be a first discharge pressure $p_{e1}$. The pressure of the fluid or the compressed air leaving the second nozzle 358 may be a second discharge pressure $p_{e2}$. The first discharge pressure $p_{e1}$ and the second discharge pressure $p_{e2}$ may be different. A third valve 355 may be disposed between the first nozzle 356 and the second nozzle 358. In some embodiments, the computing system 303 may determine which one or both of the first nozzle 356 and the second nozzle 358 the fluid or compressed air passes through, depending on a desired pressure with which to clean the sensor 360. The desired pressure with which to clean the sensor 360 may be based on a concentration of one or more foreign substances such as dust on the sensor 360, an area within a radius of the sensor 360, and/or an air quality index within a radius of the sensor 360. For example, a higher concentration of one or more foreign substances may indicate that a higher pressure of compressed air may be required to clean the sensor 360. In such a scenario, the computing system 303 may determine that whichever of the first nozzle 356 and second nozzle 358 has a higher discharge pressure is to deliver the compressed air to the sensor 360.

In some embodiments, the sensor cleaning apparatus 300 further comprises a sixth connection 370. The sixth connection 370 may comprise a pipe or a duct. The sixth connection 370 may be fastened, secured, directly connected, or otherwise fluidly connected to a second reservoir 372 that stores an amount of the fluid such as the compressed air. The second reservoir 372 may store the fluid at a second pressure $p_{r2}$. The second pressure $p_{r2}$ may be a different pressure from the first pressure $p_{r1}$. The second reservoir 372 may be fastened, secured, directly connected, or otherwise fluidly connected to a seventh connection 373. The seventh connection 373 may comprise a pipe or a duct. The seventh connection 373 may be fluidly connected to may be fastened, secured, directly connected, or otherwise fluidly connected to a filter 374 that further filters dust and solid particulates from the fluid or compressed air. The filter 374 may be fastened, secured, directly connected, or otherwise fluidly connected to an eighth connection 376. The eighth connection 376 may comprise a pipe or a duct. The eighth connection 376 may be fastened, secured, directly connected, or otherwise fluidly connected to a dryer 378 that further dries the fluid or compressed air. The dryer 378 may be fastened, secured, directly connected, or otherwise fluidly connected to a ninth connection 380. The ninth connection 380 may comprise a pipe or a duct. Along the ninth connection 380, a fourth valve 382 and a fifth valve 384 may control or restrict a flow of the fluid or the compressed air. In some embodiments, the fourth valve 382 and the fifth valve 384 may comprise check valves. In some embodiments, the fourth valve 382 and the fifth valve 384 may be electronically controlled. At an end of the ninth connection 380, a third nozzle 386 may direct the fluid or the compressed air towards the sensor 360 to be cleaned, and a fourth nozzle 388 may also direct the fluid or the compressed air towards the sensor 360. The pressure of the fluid or the compressed air leaving the third nozzle 386 may be a third discharge pressure $p_{e3}$. The pressure of the fluid or the compressed air leaving the fourth nozzle 388 may be a fourth discharge pressure $p_{e4}$. The third discharge pressure $p_{e3}$ and the fourth discharge pressure $p_{e4}$ may be different, and each of the third discharge pressure pea, the fourth discharge pressure $p_{e4}$, the first discharge pressure $p_{e1}$ and the second discharge pressure pee may be different from one another. A sixth valve 385 may be disposed between the third nozzle 386 and the fourth nozzle 388. In some embodiments, the computing system 303 may determine which ones or any of the third nozzle 386, the fourth nozzle 388, the second nozzle 358, or the first nozzle 356 the fluid or compressed air passes through, depending on a desired pressure with which to clean the sensor 360. The desired pressure with which to clean the sensor 360 may be based on a concentration of one or more foreign substances such as dust on the sensor 360, an area within a radius of the sensor 360, and/or an air quality index within a radius of the sensor 360. For example, a higher concentration of one or more foreign substances may indicate that a higher pressure of compressed air may be required to clean the sensor 360. In such a scenario, the computing system 303 may determine that whichever of the first nozzle 356, second nozzle 358, the third nozzle 386, and the fourth nozzle 388 has a sufficient discharge pressure is to deliver the compressed air to the sensor 360.

In some embodiments, the first discharge pressure $p_{e1}$ and the second discharge pressure $p_{e2}$ may be within a same order of magnitude of each other, and the third discharge pressure $p_{e3}$ and the fourth discharge pressure $p_{e4}$ may be within a same order of magnitude of each other. The first discharge pressure $p_{e1}$ and the second discharge pressure $p_{e2}$, compared to the third discharge pressure $p_{e3}$ and the fourth discharge pressure $p_{e4}$, may be of different orders of magnitude. As only an illustrative example, $p_{e1}$ may be 5 atmospheres and $p_{e2}$ may be 8 atmospheres, whereas $p_{e3}$ may be 50 atmospheres and $p_{e4}$ may be 80 atmospheres. Thus, the computing system 303 may first determine from which of the first reservoir 322 having a first pressure $p_{r1}$ or the second reservoir 372 having a second pressure $p_{r2}$ to expel the compressed air or fluid based on a concentration of the one or more foreign substances on the sensor 360, an amount of cleaning required for the sensor 360, a type of the sensor 360 that is to be cleaned, and/or a type of cleaning operation of the sensor 360. The first pressure $p_{r1}$ and the second pressure $p_{r2}$ may differ, for example, by an order of magnitude from each other. The computing system 303 may then fine-tune an amount of pressure required by selecting from a particular nozzle, either the first nozzle 356 or the second nozzle 358 if the first reservoir 322 is selected, and either the third nozzle 386 or the fourth nozzle 388 if the second reservoir 372 is selected.

In some embodiments, the computing system 303 may control the first valve 352 based on the first pressure $p_{r1}$ inside the first reservoir 322. In some embodiments, both of the first discharge pressure $p_{e1}$ and the second discharge pressure $p_{e2}$ may be lower than $p_{r1}$ due to a pressure loss from the first reservoir 322 to the first nozzle 356 or the second nozzle 358. In some embodiments, both of the third discharge pressure $p_{e3}$ and the fourth discharge pressure $p_{e4}$ may be lower than $p_{r2}$ due to a pressure loss from the second reservoir 372 to the third nozzle 386 or the fourth nozzle 388. The computing system 303 may determine a threshold value or range of values of each of the first discharge pressure $p_{e1}$, the second discharge pressure $p_{e2}$, the third discharge pressure $p_{e3}$ and the fourth discharge pressure $p_{e4}$, indicating a minimum amount of pressure, a maximum amount of pressure, and/or a range of pressures for different types of sensor cleaning operations and/or different types of sensors. For example, the computing system 303 may determine that sensor cleaning operations can be safely and effectively done with an absolute pressure range of 2 to 10 atmospheres in absolute pressure for one type of sensor, and an absolute pressure range of 12 to 15 atmospheres in absolute pressure for another type of sensor. From the threshold values or ranges of values of the of the first discharge pressure $p_{e1}$, the second discharge pressure $p_{e2}$, the third discharge pressure $p_{e3}$ and the fourth discharge pressure $p_{e4}$, the computing system 303 may determine a corresponding threshold value or range of values of $p_{r1}$ and $p_{r2}$ by taking into account actual or expected pressure losses as the compressed air or the fluid is transported from the first reservoir 322 to the first nozzle 356 or the second nozzle 358, or as the compressed air or the fluid is transported from the second reservoir 372 to the third nozzle 386 or the fourth nozzle 388. For example, the computing system 303 may determine that the corresponding range of values of $p_{r1}$ is between 2.5 and 12.5 atmospheres in absolute pressure for the one type of sensor, and the corresponding range of values of $p_{r2}$ is between 15 and 18.75 atmospheres in absolute pressure, based on a 20% pressure loss at a given temperature of the compressed air or the fluid from the first reservoir 322 to the first or second nozzles 356 or 358, or from the second reservoir 372 to the third or fourth nozzles 386 or 388. In some examples, if the current pressure $p_{r1}$ or $p_{r2}$ satisfies the corresponding threshold value or range of values of $p_{r1}$ or $p_{r2}$, the computing system 303 may control the first valve 352 or the fourth valve 382 to allow the fluid or the compressed air to go through the fifth connection 350 or the ninth connection 380 towards one of the first nozzle 356, the second nozzle 358, the third nozzle 386, or the fourth nozzle 388. If the current pressure $p_{r1}$ or $p_{r2}$ fails to satisfy the threshold value or range of values of $p_{r1}$ or $p_{r2}$, the computing system 303 may control the first valve 352 or the fourth valve 382 to block the fluid or the compressed air to prevent the fluid or the compressed air from travelling through the fifth connection 350 or the ninth connection 380 towards one of the first nozzle 356, the second nozzle 358, the third nozzle 386, or the fourth nozzle 388. For example, if the current pressure of $p_{r1}$ is outside the range of 2.5 and 12.5 atmospheres in absolute pressure, the computing system 303 may control the first valve 352 to block a flow of the fluid or compressed air through the fifth connection 350 and prevent the fluid or the compressed air from exiting at the first nozzle 356 or the second nozzle 358. In some embodiments, the computing system 303 may control the first valve 352 to always be open and permit fluid or compressed air to flow through the fifth connection 350.

In some embodiments, the computing system 303 may control an operation of the second valve 354 based on a condition of the sensor 360. The condition of the sensor 360 may comprise a concentration of one or more foreign substances, such as any of dirt, dust, or moisture, on the sensor 360. In some examples, the condition of the sensor 360 may comprise a dust particle concentration in air surrounding the sensor 360, within a threshold distance of the sensor 360, such as a distance within 10 meters of the sensor 360. In some examples, the condition of the sensor 360 may comprise a distribution of dust particle sizes. In some examples, the condition of the sensor 360 may comprise an air quality in the air surrounding the sensor 360. In some examples, a dust sensor positioned at the first nozzle 356 or the second nozzle 358 may determine the dust particle concentration in the surrounding air, and the distribution of dust particle sizes. The dust sensor may comprise an infrared light emitting diode and a photosensor, which may detect the reflected infrared light emitting diode light due to dust particles in air.

If the condition of the sensor 360 indicates that the sensor 360 requires cleaning, for example, if a concentration of one or more foreign substances such as dust satisfies a threshold concentration, the computing system 303 may control the second valve 354 to allow the fluid or the compressed air to go through the fifth connection 350 towards the first nozzle 356 or the second nozzle 358. In some examples, if the average dust particle size satisfies a threshold size, the computing system 303 may control the second valve 354 to allow the fluid or the compressed air to go through the fifth connection 350 towards the first nozzle 356 or the second nozzle 358. In some examples, if the air quality index is higher than a threshold index, the computing system 303 may control the second valve 354 to allow the fluid or the compressed air to go through the fifth connection 350 towards the first nozzle 356 or the second nozzle 358. If the condition of the sensor 360 indicates that the sensor 360 does not require cleaning, for example, if a concentration of one or more foreign substances such as dust falls short of a threshold concentration, the computing system 303 may control the second valve 354 to block the fluid or the compressed air to prevent the fluid or the compressed air from travelling through the fifth connection 350 towards the first nozzle 356 or the second nozzle 358. In some examples, if the average dust particle size falls short of a threshold size, the computing system 303 may control the second valve 354 to block the fluid or the compressed air to prevent the fluid or the compressed air from travelling through the fifth connection 350 towards the first nozzle 356 or the second nozzle 358. In some examples, if the air quality index is less than or equal to a threshold index, the computing system 303 may control the second valve 354 to block the fluid or the compressed air to prevent the fluid or the compressed air from travelling through the fifth connection 350 towards the first nozzle 356 or the second nozzle 358. In some examples, the computing system 303 may control the second valve 354 to always permit the fluid or the compressed air to pass to the first nozzle 356 or the second nozzle 358. In some examples, the computing system 303 may control the second valve 354 to permit the fluid to pass to the first nozzle 356 or the second nozzle 358 as long as the sensor 360 is determined to require cleaning, and to control the second valve 354 to block the fluid or compressed air once the sensor 360 is no longer determined to require cleaning.

In some embodiments, the computing system 303 may control an operation of the second valve 354 based on a traffic condition and/or a road condition. In some examples, if a traffic condition and/or a road condition requires use of the sensor 360, the computing system may control the second valve 354 to block the fluid or the compressed air and prevent the fluid or compressed air from exiting the nozzle 356, in order to prevent the cleaning of the sensor 360. In some examples, the computing system 303 may determine an amount, concentration, or distribution of traffic, and determine whether or not to close off a flow of the fluid or the compressed air through the second valve 354, based on the amount, concentration, or distribution of traffic and/or predicted traffic. For example, if a level of traffic is currently or is predicted to be heavy, the computing system 303 may determine to close off the flow through the second valve 354. In another example, if a road has a high concentration of bumps, or obstacles, or has a high slope, or a weather condition is inclement, the computing system 303 may determine to close off the flow through the second valve 354. In some embodiments, the computing system 303 may control an operation of the fifth valve 384 in a similar manner as described above with respect to the second valve 354.

In some embodiments, the computing system 303 may control an operation of the compressor 302 based on any of: a current velocity of the vehicle 170, a current velocity of one or more other vehicles near the vehicle 170 within a threshold distance of the vehicle 170, a traffic signal, a future predicted velocity of the vehicle 170 or of other nearby vehicles, a desired or preset frequency of cleaning of the sensor 360 and/or other sensors, a current acceleration of the vehicle 170 or of other nearby vehicles, a future acceleration of the vehicle 170 or of other nearby vehicles, or an amount of traffic. In some embodiments, the operation of the compressor 302 may be based on an operating pressure range, also known as an operating range of pressures, of the compressor 302. The operating pressure range of the compressor 302 may be a range of first pressures of $p_{r1}$ inside the first reservoir 322 during which the compressor 302 is turned on to generate the fluid or compressed air, and/or similarly, a range of second pressures of $p_{r2}$ inside the second reservoir 372 during which the compressor 302 is turned on to generate the fluid or compressed air. For example, if the operating pressure range of the compressor 302 is between 5 atmospheres and 10 atmospheres in absolute pressure, corresponding to the first reservoir 322, and between 12 atmospheres and 15 atmospheres in absolute pressure, corresponding to the second reservoir 372, the compressor 302 may be turned on if the first pressure $p_{r1}$ inside the first reservoir 322 is between 5 atmospheres and 10 atmospheres in absolute pressure, or if the second pressure $p_{r2}$ inside the second reservoir 372 is between 12 atmospheres and 15 atmospheres in absolute pressure. In this scenario, the compressor 302 may be turned off if the first pressure $p_{r1}$ inside the first reservoir 322 is outside the operating pressure range of between 5 atmospheres and 10 atmospheres in absolute pressure, and if the second pressure $p_{r2}$ inside the second reservoir 372 is outside the operating pressure range of between 12 atmospheres and 15 atmospheres in absolute pressure. In some embodiments, the controller 303 may control operations of the compressor 302 based on both parameters such as pressures within both the first reservoir 322 and the second reservoir 372. However, the description of the computing system 303 and the compressor 302 may focus on the first reservoir 322 while omitting the second reservoir 372 solely for simplicity purposes below. Corresponding features of the second reservoir 372 are also applicable to the functioning of the computing system 303 and the compressor 302, even if not explicitly mentioned.

In some embodiments, the computing system 303 may, as the first pressure $p_{r1}$ inside the first reservoir 322 decreases, keep the compressor 302 off until the first pressure $p_{r1}$ inside the first reservoir 322 reaches a cutoff pressure. For example, the computing system 303 may keep the compressor 302 off even as the first pressure $p_{r1}$ inside the first reservoir 322 decreases below 10 atmospheres absolute pressure, until the first pressure $p_{r1}$ inside the first reservoir 322 reaches a cutoff pressure of, for example, 2 atmospheres, and then turn on the compressor 302. In this manner, the computing system 303 may ensure at least a residual supply of fluid or compressed air inside the first reservoir 322.

In some embodiments, the operating range of first pressures of $p_{r1}$ inside the first reservoir 322, and the operating range of pressures of $p_{r2}$ inside the first reservoir 372 over which the compressor 302 operates, may be determined or changed based on any of, or a combination of, a current velocity of the vehicle 170, a traffic signal, a future predicted velocity of the vehicle 170, a desired or preset frequency of cleaning of the sensor 360 and/or other sensors, a current acceleration of the vehicle 170, a future acceleration of the vehicle 170, or an amount of traffic. In some examples, if the vehicle 170 is in an idle state or an engine off state, the operating range of first pressures of $p_{r1}$ inside the first reservoir 322, over which the compressor 302 operates, may be adjusted to be narrower compared to the operating range of first pressures of $p_{r1}$ inside the first reservoir 322 if the vehicle 170 were actually driving. For example, if the vehicle 170 were in an idle state or an engine off state, the operating range of first pressures of $p_{r1}$ inside the first reservoir 322 may only be from 1 atmosphere to 5 atmospheres absolute pressure compared to 1 atmosphere to 10 atmospheres absolute pressure in the scenario in which the vehicle 170 were actually driving. In such a scenario, the operating range of second pressures of $p_{r2}$ inside the second reservoir 372 may only be from 12.5 atmospheres to 14.5 atmospheres absolute pressure compared to 12 atmospheres to 15 atmospheres absolute pressure in the scenario in which the vehicle 170 were actually driving. Additionally, the cutoff pressure of $p_{r1}$ may be 1.5 atmospheres if the vehicle 170 were in an idle state or an engine off state compared 2 atmospheres in the scenario in which the vehicle 170 were actually driving. Thus, the computing system 303 may wait until the first pressure $p_{r1}$ inside the first reservoir 322 drops to 1.5 atmospheres before actually turning on the compressor 302. Therefore, when the vehicle 170 is idle, has its engine off, or is otherwise not operating, the computing system 303 may control the compressor 302 to operate less frequently and generate less noise. In some embodiments, the computing system 303 may predict a specific time at which the vehicle 170 switches from an engine off state and turns on the engine, or when the vehicle 170 switches from the idle state to a driving state, for example, when a traffic light turns from red to green, or after the vehicle restarts following a stop sign. The computing system 303 may synchronize the predicted time of the switch from the engine off state or from the idle state with an adjustment of the operating pressure range of the compressor 302. For example, the computing system 303 may adjust the operating pressure range of the compressor 302 at a same time as the predicted time of the switch. For example, if the predicted time of the switch is at 10:00 AM GMT, the computing system 303 may adjust the operating pressure range of the compressor 302 by widening the operating range of first pressures of $p_{r1}$ at the same time as the predicted time of the switch. For example, the operating pressure range of the compressor 302 may be widened from a range between 1 atmosphere and 5 atmospheres absolute pressure to a range between 1 atmosphere and 8 atmospheres absolute pressure.

In some embodiments, an increase in a velocity of the vehicle 170, and/or an increase in a frequency of engine rotation of the vehicle 170, may cause or result in a widening in the operating range of first pressures of $p_{r1}$ inside the first reservoir 322 over which the compressor 302 operates. For example, if the current velocity of the vehicle 170 is 70 miles per hour, the operating range of first pressures of $p_{r1}$ inside the first reservoir 322 over which the compressor 302 operates may be 1 atmosphere to 7 atmospheres absolute pressure. If the velocity of the vehicle 170 increases to 80 miles per hour, the operating range of first pressures of $p_{r1}$ inside the first reservoir 322 over which the compressor 302 operates may be 1 atmosphere to 8 atmospheres absolute pressure. If the velocity of the vehicle 170 decreases to 60 miles per hour, the operating range of first pressures of $p_{r1}$ inside the first reservoir 322 over which the compressor 302 operates may be 1 atmosphere to 6 atmospheres absolute pressure. In some embodiments, in response to the velocity of the vehicle 170 increasing, the cutoff pressure may also increase, for example, from 2.1 atmospheres to 2.4 atmospheres absolute pressure. In some embodiments, an upper bound of the operating range of first pressures of $p_{r1}$ inside the first reservoir 322, in absolute pressure, may be proportional to the current velocity of the vehicle 170 or the frequency of engine rotation of the vehicle 170, in revolutions per minute (RPM), while a lower bound of the operating range of first pressures of $p_{r1}$ inside the first reservoir 322 may be kept constant over all predicted future velocities or predicted frequencies of engine rotation. In some embodiments, for example, with regard to the operating range of pressures of $p_{r2}$ inside the second reservoir 372, both an upper bound and a lower bound may be changed based on a predicted future velocity or a predicted frequency of engine rotation. The cutoff pressure of the first reservoir 322 may be regulated in a correlated manner with the upper bound of the operating range. Thus, in response to the upper bound of the operating range increasing, the cutoff pressure may also increase. An amount of increase of the cutoff pressure of the first reservoir 322 may be proportional to an amount of increase of the upper bound of the operating range. For example, if the upper bound of the operating range increases from 7 atmospheres absolute pressure to 8 atmospheres absolute pressure, the cutoff pressure may increase from 2.1 atmospheres absolute pressure to 2.4 atmospheres absolute pressure.

In other embodiments, an increase in a velocity of the vehicle 170, and/or an increase in a frequency of engine rotation of the vehicle 170, may cause or result in the computing system 303 narrowing the operating range of first pressures of $p_{r1}$ inside the first reservoir 322 over which the compressor 302 operates.

In other embodiments, in response to a velocity of the vehicle 170 decreasing, or in response to the predicted frequency of engine rotation of the vehicle 170 decreasing, the computing system 303 may widen the operating range of first pressures of $p_{r1}$ inside the first reservoir 322 over which the compressor 302 operates. This widening of the operating range of pressures may provide additional fluid or compressed air in the first reservoir 322 so that if cleaning of the sensor 360 is required when the vehicle 170 is travelling at a lower speed or experiencing an idle state or engine off state, the compressor 302 does not need to be turned on. Additionally, the computing system 303 may harness or divert energy from braking to the compressor 302. For example, the computing system 303 may control the slow down the vehicle 170 using regenerative braking to convert a kinetic energy of the movement of the vehicle 170 into energy for the compressor 302 to generate the fluid or compressed air. In some examples, the computing system 303 may control the conversion of the kinetic energy, using a motor, into battery power, which may be converted into energy for the compressor 302. In some examples, the computing system 303 may control the conversion of the kinetic energy using a hydraulic motor to store energy as compressed air, which may be fed directly to the first reservoir 322 and/or the second reservoir 372.

In some embodiments, in response to the velocity of the vehicle 170 decreasing, or in response to the predicted frequency of engine rotation of the vehicle 170 decreasing, the cutoff pressure may also increase, for example, from 2.1 atmospheres to 2.4 atmospheres.

In some examples, in response to the velocity of the vehicle 170 decreasing, an upper bound of the operating range of first pressures of $p_{r1}$ inside the first reservoir 322, in absolute pressure, may increase, while a lower bound of the operating range of first pressures of $p_{r1}$ may be kept constant. The upper bound may be inversely proportional to the velocity of the vehicle 170, in some examples. In some examples, the lower bound of the operating range may also decrease in response to the decrease in the predicted future velocity of the vehicle 170. For example, if the velocity of the vehicle has decreased from 50 miles per hour to 25 miles per hour, the operating range of first pressures of $p_{r1}$ inside the first reservoir 322 may change from 1-5 atmospheres absolute pressure to 0.5-10 atmospheres absolute pressure. In such a scenario, an original lower bound may be 1 atmosphere absolute pressure, an original upper bound may be 5 atmospheres absolute pressure, an updated lower bound may be 0.5 atmospheres absolute pressure, and an updated upper bound may be 10 atmospheres absolute pressure. The cutoff pressure may be regulated in a correlated manner with the upper bound of the operating range. Thus, in response to the upper bound of the operating range increasing, the cutoff pressure may also increase. An amount of increase of the cutoff pressure may be proportional to an amount of increase of the upper bound of the operating range.

In other embodiments, the computing system 303 may adjust the operating range of the compressor 302 to be widened in response to the vehicle 170 slowing down, but once the vehicle 170 reaches a threshold velocity while slowing down, the computing system 303 may adjust the operating range of the compressor 302 to be narrowed in response to the vehicle 170 slowing down. For example, if a velocity of the vehicle 170 dips to below the threshold velocity, such as 25 miles per hour, the operating range of the compressor may be narrowed as the vehicle 170 slows down further.

Similarly, the computing system 303 may adjust the operating range of first pressures of $p_{r1}$ inside the first reservoir 322 over which the compressor 302 operates, as a function of a future or predicted trajectory of the vehicle. A change in a planned trajectory of the vehicle 170 due to traffic, traffic signs, road conditions, detours, or a route, may cause or result in a change in the operating range of the compressor 302. The computing system 303 may dynamically change the operating range of the compressor 302 based on the change in the planned trajectory of the vehicle 170. An increase in a predicted future velocity of the vehicle 170, and/or an increase in a predicted future frequency of engine rotation of the vehicle 170, may cause or result in the computing system 303 widening the operating range of first pressures of $p_{r1}$ inside the first reservoir 322 over which the compressor 302 operates. In some embodiments, in response to the predicted velocity of the vehicle 170 increasing, or in response to the predicted frequency of engine rotation of the vehicle 170 increasing, the cutoff pressure may also increase, for example, from 2.1 atmospheres to 2.4 atmospheres. In some examples, an upper bound of the operating range of first pressures of $p_{r1}$ inside the first reservoir 322, in absolute pressure, may be proportional to the predicted future velocity of the vehicle 170 or the predicted frequency of engine rotation of the vehicle 170, while a lower bound of the operating range of first pressures of $p_{r1}$ may be kept constant over all predicted future velocities or predicted frequencies of engine rotation. In other examples, on the other hand, an increase in a predicted future velocity of the vehicle 170, and/or an increase in a predicted future frequency of engine rotation of the vehicle 170, may cause or result in a narrowing in the operating range of first pressures of $p_{r1}$ inside the first reservoir 322 over which the compressor 302 operates. Because the computing system 303 may anticipate that the velocity of the vehicle 170 may increase, which may result in a future increase in a noise level caused by an engine of the vehicle 170, the computing system 303 may control the compressor 302 to operate more frequently when the velocity of the vehicle 170 actually increases and less frequently before the velocity of the vehicle 170 actually increases. The computing system 303 may widen the operating range of first pressures of $p_{r1}$ inside the first reservoir 322 once the velocity of the vehicle 170 actually increases, but narrow the operating range of first pressures of $p_{r1}$ before the velocity of the vehicle 170 increases. The cutoff pressure of the first reservoir 322 may be regulated in a correlated manner with the upper bound of the operating range. Thus, in response to the upper bound of the operating range increasing, the cutoff pressure may also increase. An amount of increase of the cutoff pressure of the first reservoir 322 may be proportional to an amount of increase of the upper bound of the operating range.

Meanwhile, a decrease in a predicted future velocity of the vehicle 170, and/or a decrease in a predicted future frequency of engine rotation of the vehicle 170, may cause or result in the computing system 303 widening the operating range of first pressures of $p_{r1}$ inside the first reservoir 322 over which the compressor 302 operates. This widening of the operating range of pressures may provide additional fluid or compressed air in the first reservoir 322 so that if cleaning of the sensor 360 is required when the vehicle 170 is predicted to be travelling at a lower speed or predicted to experience an idle state or engine off state, the compressor 302 does not need to be turned on. In some embodiments, in response to the predicted velocity of the vehicle 170 decreasing, or in response to the predicted frequency of engine rotation of the vehicle 170 decreasing, the cutoff pressure may also increase, for example, from 2.1 atmospheres to 2.4 atmospheres.

In some examples, in response to a decrease in the predicted future velocity of the vehicle 170, an upper bound of the operating range of first pressures of $p_{r1}$ inside the first reservoir 322, in absolute pressure, may increase, while a lower bound of the operating range of first pressures of $p_{r1}$ may be kept constant over any predicted future velocities or predicted frequencies of engine rotation. The upper bound may be inversely proportional to the predicted future velocity of the vehicle 170, in some examples. In some examples, the lower bound of the operating range may also decrease in response to the decrease in the predicted future velocity of the vehicle 170. For example, if the future velocity of the vehicle is predicted to decrease from 50 miles per hour to 25 miles per hour, the operating range of first pressures of $p_{r1}$ inside the first reservoir 322 may change from 1-5 atmospheres absolute pressure to 0.5-10 atmospheres absolute pressure. In such a scenario, an original lower bound may be 1 atmosphere absolute pressure, an original upper bound may be 5 atmospheres absolute pressure, an updated lower bound may be 0.5 atmospheres absolute pressure, and an updated upper bound may be 10 atmospheres absolute pressure. The cutoff pressure may be regulated in a correlated manner with the upper bound of the operating range. Thus, in response to the upper bound of the operating range increasing, the cutoff pressure may also increase. An amount of increase of the cutoff pressure may be proportional to an amount of increase of the upper bound of the operating range.

In other examples, on the other hand, an increase in a predicted future velocity of the vehicle 170, and/or an increase in a predicted future frequency of engine rotation of the vehicle 170, may cause or result in a narrowing in the operating range of first pressures of $p_{r1}$ inside the first reservoir 322 over which the compressor 302 operates. Because the computing system 303 may anticipate that the velocity of the vehicle 170 may increase, which may result in a future increase in a noise level caused by an engine of the vehicle 170, the computing system 303 may control the compressor 302 to operate more frequently when the velocity of the vehicle 170 actually increases and less frequently before the velocity of the vehicle 170 actually increases. The computing system 303 may widen the operating range of first pressures of $p_{r1}$ inside the first reservoir 322 once the velocity of the vehicle 170 actually increases, but narrow the operating range of first pressures of $p_{r1}$ before the velocity of the vehicle 170 increases. The cutoff pressure may be regulated in a correlated manner with the upper bound of the operating range. Thus, in response to the upper bound of the operating range increasing, the cutoff pressure may also increase. An amount of increase of the cutoff pressure may be proportional to an amount of increase of the upper bound of the operating range.

In some embodiments, an increase in an acceleration or a predicted future acceleration of the vehicle 170, may cause or result in a widening in the operating range of first pressures of $p_{r1}$ inside the first reservoir 322 over which the compressor 302 operates. A decrease in the acceleration or the predicted future acceleration of the vehicle 170 may cause or result in a narrowing in the operating range of first pressures of $p_{r1}$ inside the first reservoir 322 over which the compressor 302 operates. In some embodiments, in response to the acceleration or the predicted acceleration of the vehicle 170 increasing, the computing system 303 may increase the cutoff pressure, for example, from 2.1 atmospheres to 2.4 atmospheres. The amount of increase in the cutoff pressure may be proportional to the increase of the upper bound of the operating range of first pressures of pd.

In other embodiments, in response to the predicted acceleration of the vehicle 170 decreasing, an upper bound of the operating range of first pressures of $p_{r1}$ inside the first reservoir 322, in absolute pressure, may increase, while a lower bound of the operating range of first pressures of $p_{r1}$ may be kept constant over any predicted future velocities or predicted frequencies of engine rotation. In some examples, the lower bound of the operating range may also decrease in response to the decrease in the predicted future acceleration of the vehicle 170. For example, if the future acceleration of the vehicle is predicted to decrease from 0 miles per hour to negative 5 miles per hour per hour (e.g., the vehicle is predicted to decelerate), the operating range of pressures of $p_{r1}$ inside the first reservoir 322 may change from 1-5 atmospheres absolute pressure to 0.5-10 atmospheres absolute pressure. In such a scenario, an original lower bound may be 1 atmosphere absolute pressure, an original upper bound may be 5 atmospheres absolute pressure, an updated lower bound may be 0.5 atmospheres absolute pressure, and an updated upper bound may be 10 atmospheres absolute pressure. The cutoff pressure may be regulated in a correlated manner with the upper bound of the operating range. Thus, in response to the upper bound of the operating range increasing, the cutoff pressure may also increase. An amount of increase of the cutoff pressure may be proportional to an amount of increase of the upper bound of the operating range.

In some embodiments, the controlling the operation of the compressor 302 comprises determining an operating pressure range of the compressor 302 based on a traffic sign or signal. For example, if the vehicle 170 is approaching a red light or stop sign ahead, the computing system 303 may widen the operating range of first pressures of $p_{r1}$ inside the first reservoir 322 because the vehicle 170 is anticipated to slow down. In some examples, if the vehicle 170 is approaching a traffic light ahead and the vehicle 170 is anticipated to speed up, the computing system 303 may narrow the operating range of first pressures of $p_{r1}$ and/or the operating range of second pressures of $p_{r2}$. In some examples, the computing system 303 may determine an amount, concentration, or distribution of traffic, and determine an operating pressure range of the compressor based on the amount, concentration, or distribution of traffic and/or predicted traffic. For example, if the traffic is predicted to increase, the computing system 303 may narrow the operating range of first pressures of $p_{r1}$ and/or the operating range of second pressures of $p_{r2}$ in order to reduce a frequency of operation of the compressor 302 and resulting noise. Additionally, the computing system 303 may reduce a frequency of cleaning the one or more sensors including the sensor 360 in conditions of higher traffic in order to prevent interference with a usage of the one or more sensors. In other examples, the computing system 303 may narrow the operating range of first pressures of $p_{r1}$ and/or the operating range of second pressures of $p_{r2}$ in response to harsh road conditions such as bumps, high slope, and/or a concentration of obstacles on a road, because sensor cleaning may not take place during such harsh road conditions in order to prevent interference with a usage of the one or more sensors. In other examples, the computing system 303 may clean sensors in response to harsh road conditions or heavy traffic, only if the sensors to be cleaned have other redundant operational sensors, and/or not clean redundant sensors simultaneously, but rather, space out a cleaning of the redundant sensors over time.

In some embodiments, the computing system 303 may adjust control of the compressor 302, including the operating range of the compressor 302, based on a weather condition and/or a background noise. In some examples, in response to an increasing level of precipitation, the computing system 303 may widen the operating range of the compressor 302 because a frequency of cleaning the sensors such as the sensor 360 may increase, in order to remove precipitation that otherwise may obstruct the sensors. Additionally, in response to an increasing level of background noise, the computing system 303 may widen the operating range of the compressor 302 because the noise produced by the compressor 302 may be drowned out by the background noise. In some embodiments, the level of background noise may be determined by the microphone, for example, determining the level of background noise when the compressor 302 is turned off. In some embodiments, the computing system 303 may adjust the operating range of the compressor 302 based on a rotation speed of a windshield wiper. In some examples, the computing system 303 may widen the operating range of the compressor 302 in response to the rotation speed of the windshield wiper increasing, and narrow the operating range of the compressor 302 in response to the rotation speed of the windshield wiper decreasing. In some embodiments, the computing system 303 may determine an operating range of the compressor 302 based on an air quality index (AQI). For example, as the AQI increases, the computing system may narrow the operating range of the compressor 302 to lower an amount of unclean air from entering into the compressor 302.

In some embodiments, the sensor cleaning apparatus 300 further includes a mechanical filter that filters noise frequencies using components such as an operational amplifier. The mechanical filter may be specifically tailored for particular frequencies or frequency ranges of the noise. In some examples, the mechanical filter may be incorporated as an absorptive muffler or a reactive muffler. For example, an absorptive muffler absorbs waves of particular frequencies. For example, a reactive muffler may comprise lumped elements that reflects waves of particular frequencies.

Figure 4:
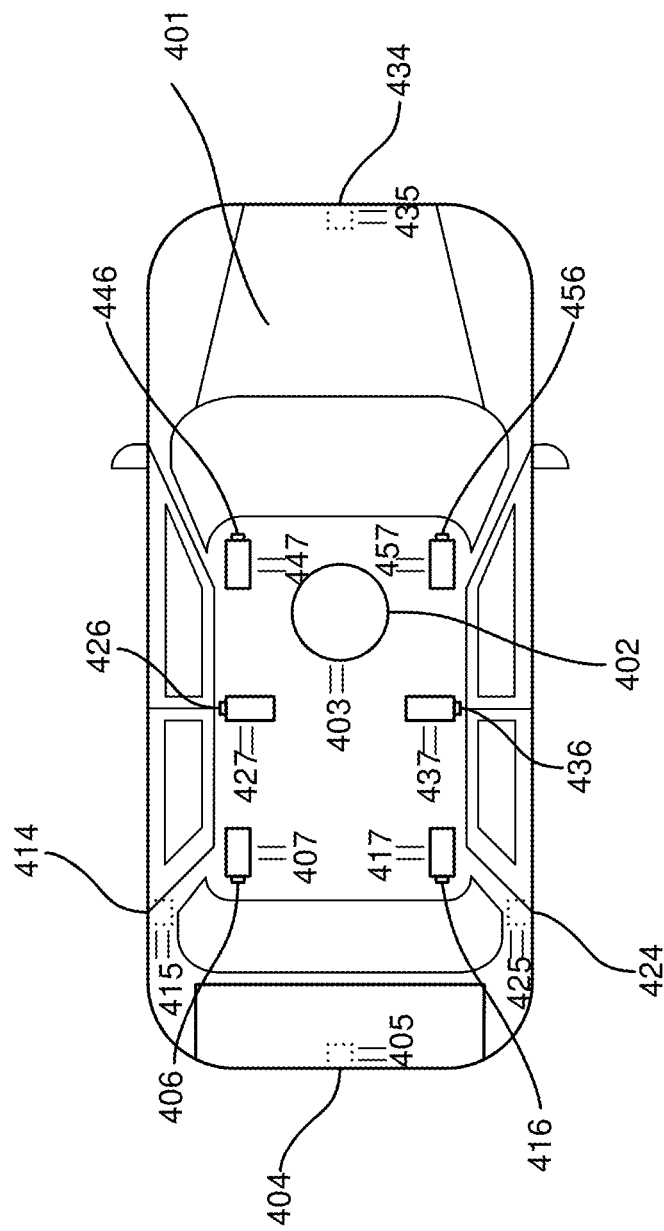
FIG. 4 illustrates an exemplary vehicle on which the sensor cleaning apparatus is being implemented.

FIG. 4 illustrates an exemplary vehicle on which the sensor cleaning apparatus is being implemented. In FIG. 4, a vehicle 401, which may be implemented as the vehicle 170 of FIG. 1C, may comprise a LiDAR sensor 402, a first radar 404 located at a rear of the vehicle 401, a first camera 406 located at a rear of the vehicle 401, a second radar 414, a second camera 416, a third radar 424, a third camera 426, a fourth radar 434, a fourth camera 436, a fifth camera 446, and a sixth camera 456. For example, the LiDAR sensor 402 can generate a three-dimensional map of the environment. The LiDAR sensor 402 can also detect objects in the environment. In another example, the radars 404, 414, 424, and 434 can determine distances and speeds of objects around the vehicle 401, and may be configured for adaptive cruise control and/or accident avoidance and blind spot detection. In another example, the cameras 406, 416, 426, 436, 446, and 456 can capture and process image data to detect and identify objects, such as road signs, as well as deciphering content of the objects, such as speed limit posted on the road signs. Such objects may include, but not limited to, pedestrians, road signs, traffic lights, and/or other vehicles, for example. In some embodiments, the cameras 406, 416, 426, 436, 446, and 456 can recognize, interpret, and analyze road signs (e.g., speed limit, school zone, construction zone, etc.) and traffic lights (e.g., red light, yellow light, green light, flashing red light, etc.). The vehicle 401 can also include myriad actuators to propel and navigate the vehicle 401 in the surrounding. Such actuators may include, for example, any suitable electro-mechanical devices or systems to control a throttle response, a braking action, a steering action, etc. In some embodiments, based on image data captured by the cameras 406, 416, 426, 436, 446, and 456, the vehicle 401 can adjust vehicle speed based on speed limit signs posted on roadways. For example, the vehicle 401 can maintain a constant, safe distance from a vehicle ahead (e.g., adaptive cruise control). In this example, the vehicle 401 maintains this safe distance by constantly adjusting its vehicle speed to that of the vehicle ahead.

Corresponding nozzles may be disposed near each of the LiDAR sensor, the radars, and the cameras, within a specified distance of each of the respective sensors, in order to provide compressed air or fluid to clean each of the sensors. Each of the nozzles may be fluidly connected to one or more reservoirs and a compressor, as described with respect to FIG. 1A or FIG. 3. Each of the nozzles may have a range of discharge pressures specific for the corresponding sensor type and further based on a historical cleaning data for the corresponding sensor, such as, previous pressures of compressed air applied to the corresponding sensor. For example, a first nozzle 403 may correspond to the LiDAR sensor 402, a second nozzle 405 may correspond to the first radar 404, a third nozzle 407 may correspond to the first camera 406, a fourth nozzle 415 may correspond to the second radar 414, a fifth nozzle 417 may correspond to the second camera 416, a sixth nozzle 425 may correspond to the third radar 424, a seventh nozzle 427 may correspond to the third camera 426, an eighth nozzle 435 may correspond to the fourth radar 434, a ninth nozzle 437 may correspond to the fourth camera 436, a tenth nozzle 447 may correspond to the fifth camera 446, and an eleventh nozzle 457 may correspond to the sixth camera 456.

Figure 5:
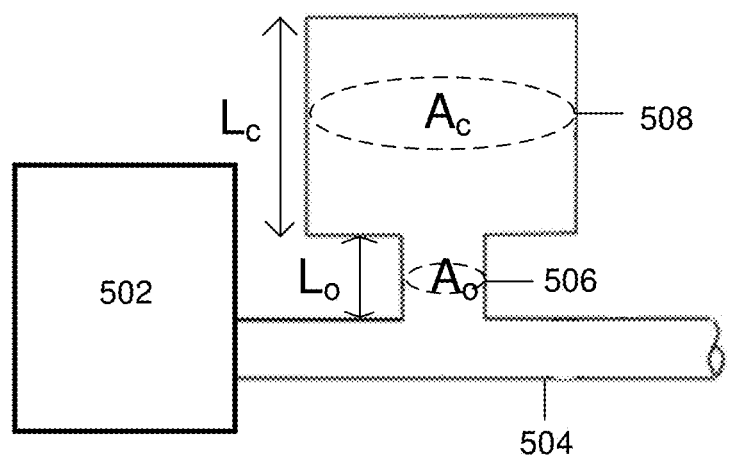
FIG. 5 illustrates an exemplary assembly or device associated with the sensor cleaning apparatus, to reduce noise from the sensor cleaning apparatus.

FIG. 5 illustrates an exemplary assembly 500 to reduce noise from a compressor. The assembly 500 may comprise a compressor 502, which may be implemented as the compressor 102 of FIG. 1A or the compressor 302 of FIG. 3. The compressor 502 may be directly connected or otherwise fluidly connected to a resonator comprising a tube 504, an opening 506 having a length $L_o$ and a cross-sectional area $A_o$ of the opening and a chamber 508 having a length $L_c$ and a cross-sectional area $A_c$ of the chamber 508. The chamber 508 may be analogous to a massless spring in a mechanical device, and the opening 506 may be analogous to a damper in the mechanical device. In some embodiments, the chamber 508 may be lined with one or more absorbent materials. In some embodiments, the assembly 500 may reduce or eliminate a particular frequency f of noise, and be designed with dimensions specifically configured to eliminate or reduce the particular frequency f of noise. The particular frequency f of noise may be determined using previous information acquired by a microphone and computing system in a similar type of vehicle and/or similar type of compressor, and/or previous data acquired from the vehicle 170. In some embodiments, the parameters $L_o$, $A_o$, $L_c$, and $A_c$ may be determined based on the following:

$$f = \frac{c}{2\pi}\sqrt{-\frac{3L_o + L_c A}{2L_o^3} + \sqrt{\left(\frac{3L_o + L_c A}{2L_o^3}\right)^2 + \frac{3A}{L_o^3 L_c}}} \quad \text{(Equation 1)}$$

$$f < 0.2756 \frac{c}{L_c} \quad \text{(Equation 2)}$$

$$A = \frac{A_c}{A_o} = \tan(kL_o) * \tan(k\ L_c), \quad \text{(Equation 3)}$$

In the above equations 1-3, A is an area ratio between the cross sectional area $A_o$ of the opening and the cross sectional area $A_c$ of the chamber, k is a wave number, and c is a speed of sound through the fluid or compressed air medium.

Figure 6:
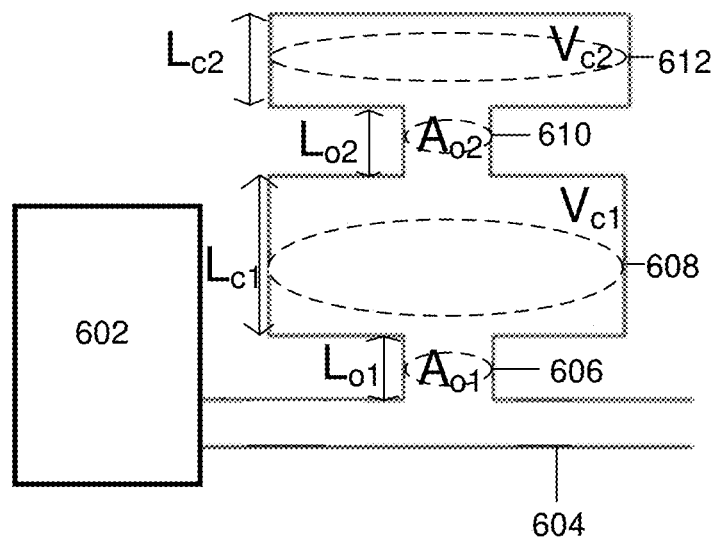
FIG. 6 illustrates an exemplary assembly or device associated with the sensor cleaning apparatus, to reduce noise from the sensor cleaning apparatus.

FIG. 6 illustrates an exemplary assembly 600 to reduce noise from a compressor. The assembly 600 may comprise a compressor 602, which may be implemented as the compressor 102 of FIG. 1A or the compressor 302 of FIG. 3. The compressor 602 may be directly connected or otherwise fluidly connected to a resonator comprising a tube 604, a first opening 606 having a first length $L_{o1}$ and a first cross-sectional area $A_{o1}$ of the first opening 606 and a first chamber 608 having a first length $L_{c1}$, and a first volume $V_{c1}$ of the first chamber 608. The resonator may further comprise a second opening 610 having a second length $L_{o2}$ and a second cross-sectional area $A_{o2}$ of the second opening 610 and a second chamber 612 having a second length $L_{c2}$, and a second volume $V_{c2}$ of the second chamber 612. In some embodiments, the first chamber 608 and/or the second chamber 612 may be lined with one or more absorbent materials.

In some embodiments, the assembly 600 may reduce or eliminate particular frequencies $f_1$ and $f_2$ of noise, and be designed with dimensions specifically configured to eliminate or reduce the particular frequencies $f_1$ and $f_2$ of noise. The particular frequencies $f_1$ and $f_2$ of noise may be determined using previous information acquired by a microphone and computing system in a similar type of vehicle and/or similar type of compressor, and/or previous data acquired from the vehicle 170. In some embodiments, the parameters $L_{o1}, A_{o1}, L_{c1}, L_{o2}, A_{o2}, L_{c2}, V_{c1}$, and $V_{c2}$ may be determined based on the following:

pressure vibrations caused by sounds may be summed at loci 808, then summed at 806. At loci 808 the two pipes 804 connecting each low-impedance inlet 802 to the microbarometer or barometer at 806 intersect. Each set of low-impedance inlets 802 comprises a locus 808. Adjacent to the locus 808, impedance matching plugs in each pipe 804 may eliminate or reduce mismatch in resonant frequency between each pipe 804. In some examples, the plugs may comprise cylinders with small holes. A length and diameter of the holes may be based on dimensions of the pipe to prevent reflections back to the microbarometer at 806. The low-impedance inlets 802 may be disposed in a geometrically regular pattern around a circular shape. A pressure measured at the microbarometer at 806 may be a sum of pressure changes simultaneously entering each inlet of the filter. As an example, the low-impedance inlets 802 and/or pipes 804 may be comprised of galvanized metal, or stainless steel to prevent corrosion. As an example, the mechanical filter 800 may filter noise from between 0.01 Hz and 50 Hz.

Figure 9:
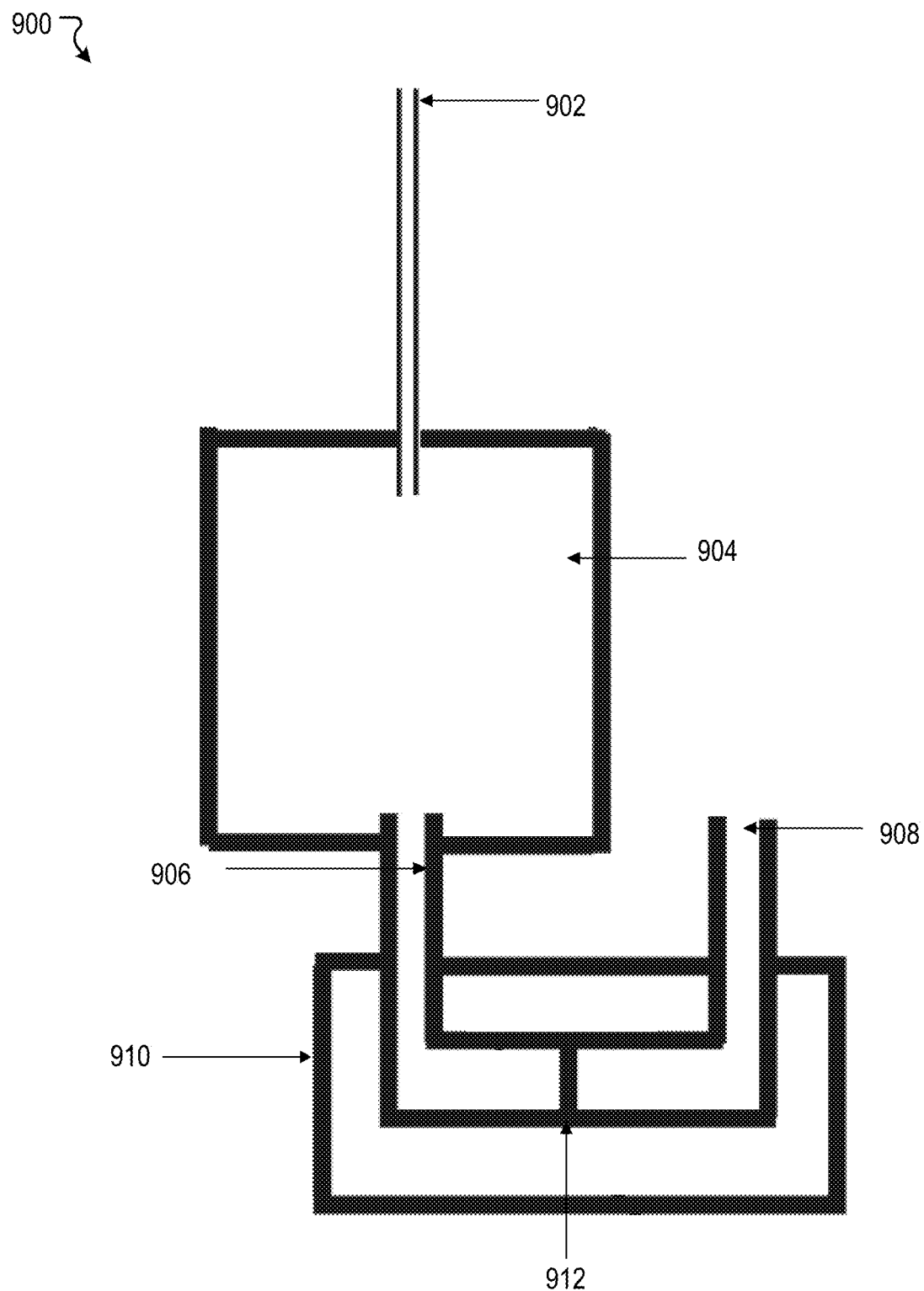
FIG. 9 illustrates an exemplary assembly or device associated with the sensor cleaning apparatus, to reduce noise from the sensor cleaning apparatus.

In some embodiments, as shown in FIG. 9, a mechanical filter 900, which may be directly, indirectly, or fluidly connected with a compressor such as the compressor 102 of FIG. 1A or the compressor 302 of FIG. 3, may comprise a $$f_{1,2} = \frac{c}{2\sqrt{(2\pi)}} \sqrt{\left(\frac{A_{o1}}{L_{o1}*V_{c1}} + \frac{A_{o2}}{L_{o2}*V_{c1}} + \frac{A_{o2}}{L_{o2}*V_{c2}}\right) \pm \sqrt{\left(\frac{A_{o1}}{L_{o1}*V_{c1}} + \frac{A_{o2}}{L_{o2}*V_{c1}} + \frac{A_{o2}}{L_{o2}*V_{c2}}\right)^2 3 - 4\frac{A_{o1}}{L_{o1}*V_{c1}}\frac{A_{o2}}{L_{o2}*V_{c1}}}} \quad \text{(Equation 4)}$$

$$V_{c1} = \frac{8A_{o1}^2 A_{o2} c^4}{L_{o1}(2A_{o1}A_{o2}c^2 f_1^2 + 2A_{o1}A_{o2}c^2 f_2^2 - \sqrt{(4A_{o1}^2 A_{o2}^2 c^4 f_1^4 - 8A_{o1}^2 A_{o2}^2 c^4 f_1^2 f_2^2 + 4A_{o1}^2 A_{o2}^2 c^4 f_2^4 - \frac{16A_{o1}A_{o2}^3 L_{o1} f_1^2 f_2^2 c^4}{L_{o2}}})} + \quad \text{(Equation 5)}$$

$$\frac{8A_{o2}^2 A_{o1} c^4}{L_{o2}(2A_{o1}A_{o2}c^2 f_1^2 + 2A_{o1}A_{o2}c^2 f_2^2 - \sqrt{4A_{o1}^2 A_{o2}^2 c^4 f_1^4 - 8A_{o1}^2 A_{o2}^2 c^4 f_1^2 f_2^2 + 4A_{o1}^2 A_{o2}^2 c^4 f_2^4 - \frac{16A_{o1}A_{o2}^3 L_{o1} f_1^2 f_2^2 c^4}{L_{o2}}})}$$

$$V_{c2} = \frac{(A_{o1}A_{o2}c^2 f_1^2 + A_{o1}A_{o2}c^2 f_2^2)}{f_1^2 f_2^2 (A_{o2}L_{o1} + A_{o1}L_{o2})} - \quad \text{(Equation 6)}$$

$$\frac{0.5\sqrt{4A_{o1}^2 A_{o2}^2 c^4 f_1^4 + 8A_{o1}^2 A_{o2}^2 c^4 f_1^2 f_2^2 + 4A_{o1}^2 A_{o2}^2 c^4 f_2^4 - \frac{16A_{o1}A_{o2}^3 L_{o1} f_1^2 f_2^2 c^4 + 16A_{o1}A_{o2}^2 L_{o2} f_1^2 f_2^2 c^4}{L_{o2}}}}{f_1^2 f_2^2 (A_{o2}L_{o1} + A_{o1}L_{o2})}$$

$$\frac{f_1^2}{f_2^2} + \frac{f_2^2}{f_1^2} \geq 2 + \frac{4A_{o2}L_{o1}}{A_{o1}L_{o2}} \quad \text{(Equation 7)}$$

In the above equations 4-7, c is a speed of sound through the fluid or compressed air medium.

Figure 7:
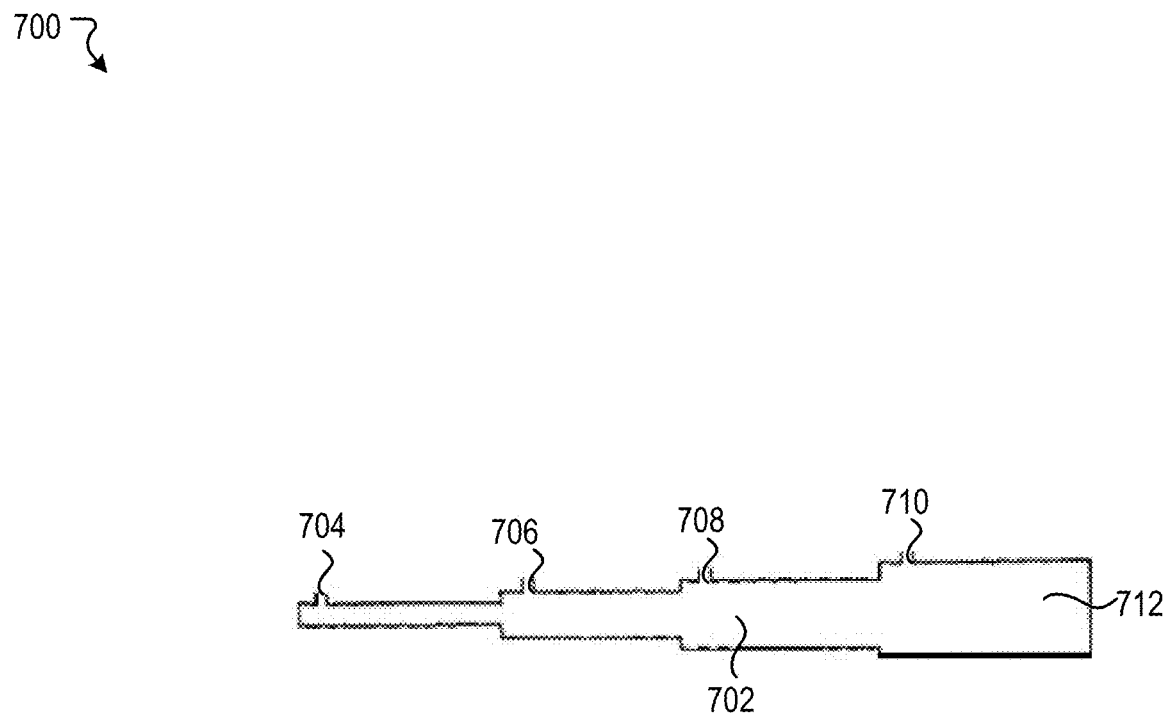
FIG. 7 illustrates an exemplary assembly or device associated with the sensor cleaning apparatus, to reduce noise from the sensor cleaning apparatus.

In some embodiments, as shown in FIG. 7, a mechanical filter 700, which may be directly, indirectly, or fluidly connected with a compressor such as the compressor 102 of FIG. 1A or the compressor 302 of FIG. 3, may comprise a series of different tapered pipes 702 with pressure sensing inlets 704, 706, 708, 710, distributed along its length and a microbarometer or barometer connected to its wide end 712. Successively larger diameters may acoustically scale coherent noise signals that propagate toward its wide end. Incoherent noise from the inlets that travels acoustically inside the pipe may be attenuated due to the scaling.

Figure 8:
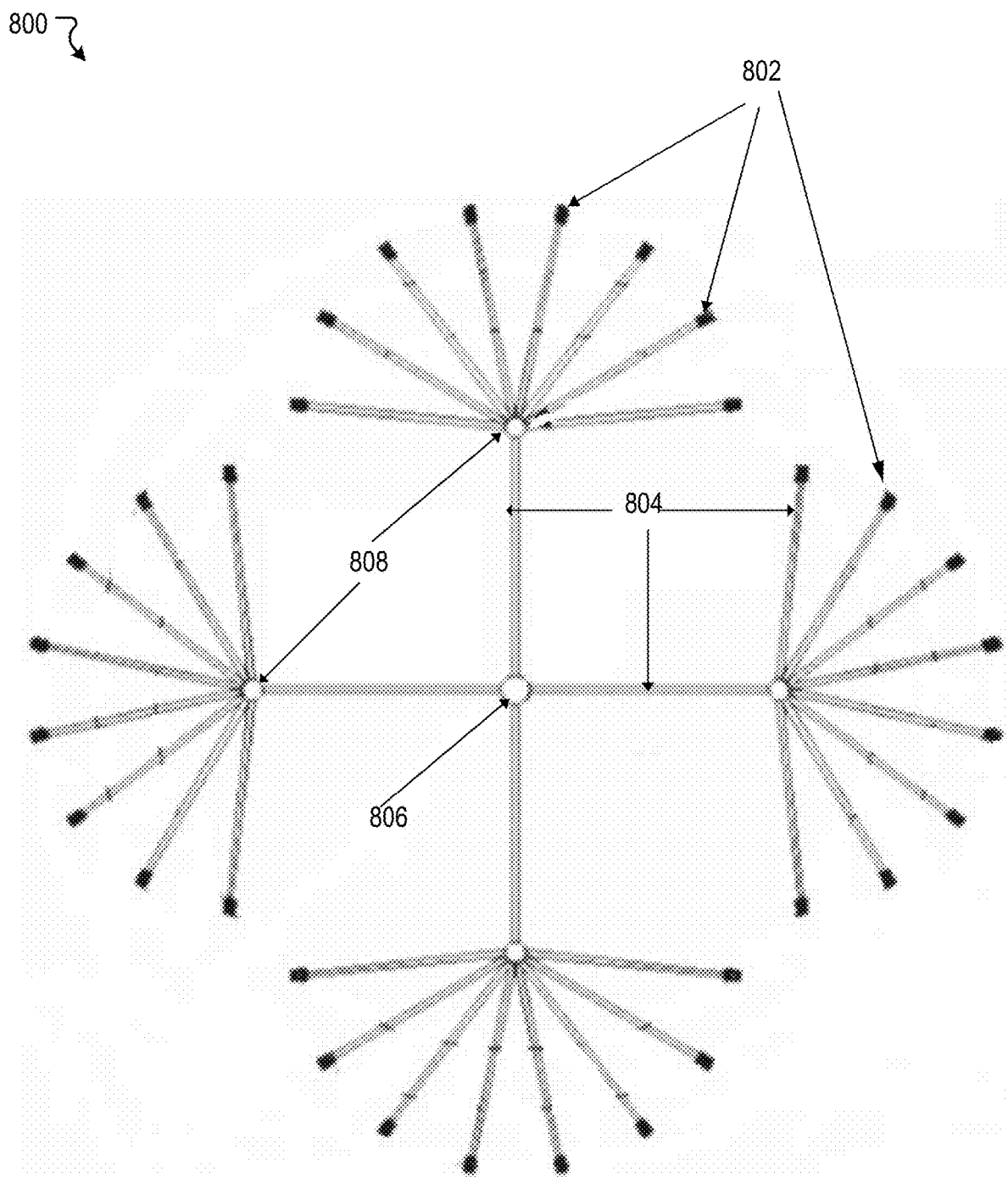
FIG. 8 illustrates an exemplary assembly or device associated with the sensor cleaning apparatus, to reduce noise from the sensor cleaning apparatus.

In some embodiments, as shown in FIG. 8, a mechanical filter 800, which may be directly, indirectly, or fluidly connected with a compressor such as the compressor 102 of FIG. 1A or the compressor 302 of FIG. 3, may comprise low-impedance inlets 802 connected by pipes 804, for example, to a microbarometer or barometer at 806. Initially, tube 902 such as a capillary tube, a chamber 904, a first port 906, a second port 908, a pressure transducer 910, and a diaphragm 912. The tube 902 paired with the chamber 904, which may be a closed volume chamber, may act as a low-pass filter. The chamber 904 may operate adiabatically, isothermally, or transitionally from adiabatic to isothermal. The pressure transducer 910 may be linearly responsive to static or dynamic pressures and may comprise the first port 906 connected and adjacent to the chamber 904 and the second port 908 connected to the atmosphere. The first port 906 and the second port 908 may be connected by the diaphragm 912, which may be a flexible silicon diaphragm. As an example, a Wheatstone bridge may sense deflection by determining changes in piezoresistive elements connected to the diaphragm 912. A sensitivity of the Wheatstone bridge may be proportional to a voltage of a supply voltage.

Figure 10:
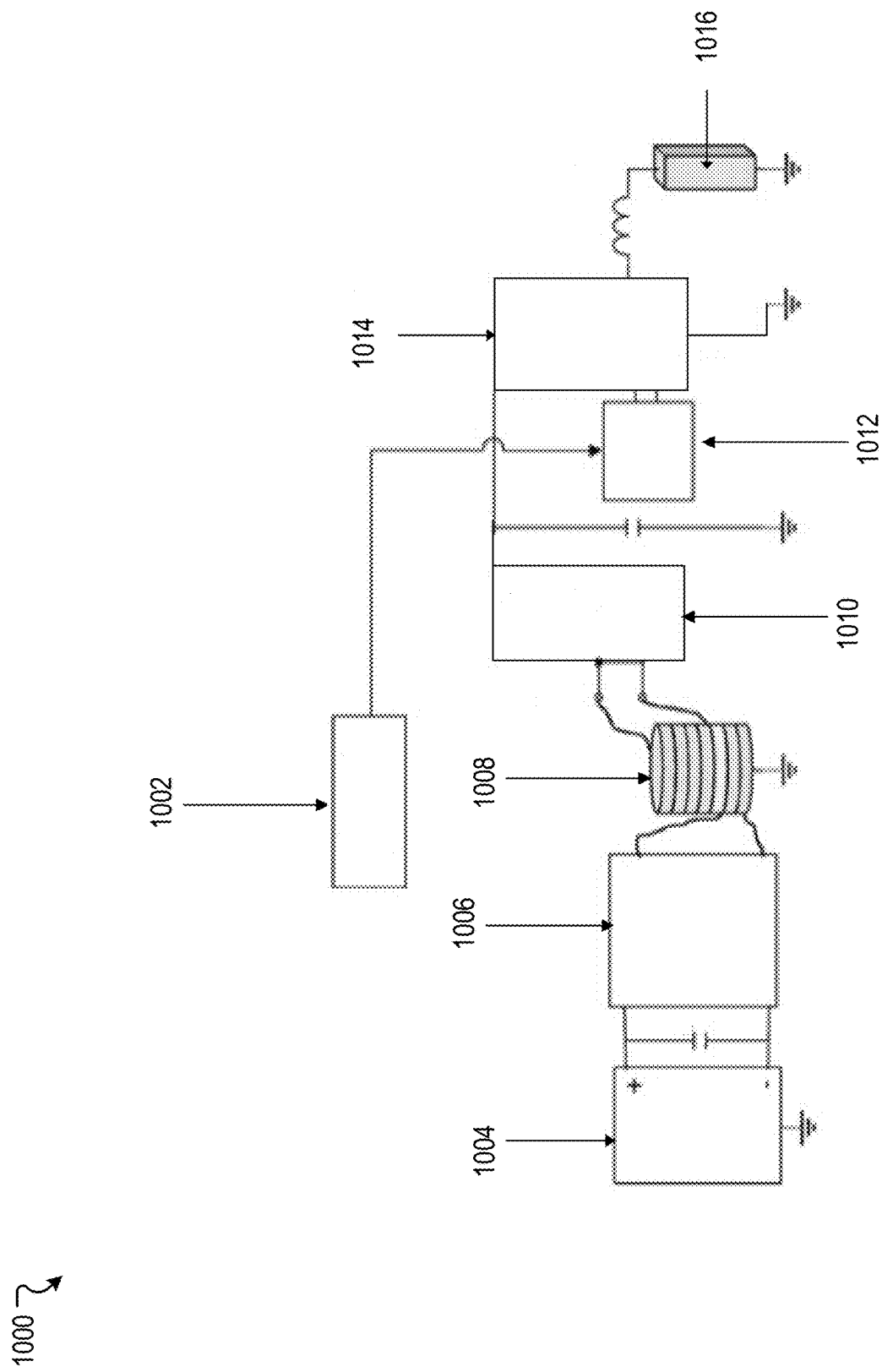
FIG. 10 illustrates an exemplary assembly or device associated with the sensor cleaning apparatus, to reduce noise from the sensor cleaning apparatus.

In some embodiments, as shown in FIG. 10, an active damping system 1000, which may be directly, indirectly, or fluidly connected with a compressor such as the compressor 102 of FIG. 1A or the compressor 302 of FIG. 3, may comprise one or more of, or all of, a vibration sensor 1002, a DC battery 1004, a first DC-AC inverter 1006, a piezoelectric element 1008, an AC-DC rectifier 1010, a control circuit 1012, a second DC-AC inverter 1014, and a piezoelectric actuator 1016. The active damping system 1000 may form a resonance circuit with piezoelectric elements that may act as a capacitor, at least one additional capacitor, and one or more inductance elements or equivalents to reduce noise. As noise is inputted into the active damping system 1000, the piezoelectric element 1008, for example, may be excited at a frequency range centered on a resonance frequency of the noise and may generate a voltage. The generated voltage may be supplied to downstream circuit elements such as the AC-DC rectifier 1010, the control circuit 1012, the second DC-AC inverter 1014, and the piezoelectric actuator 1016. The control circuit 1012, for example, may generate a signal having an opposite phase to cancel out or oppose the original generated voltage. The piezoelectric actuator 1016 may output a force corresponding to the signal having the opposite phase to cancel out or oppose the noise.

Voltage from the DC battery 1004 may be fed to the first DC-AC inverter 1006, which may be a resonant inverter to drive the piezoelectric element 1008. A frequency of the first DC-AC inverter 1006 may be determined to match a first mechanical resonance of the piezoelectric element 1008. The piezoelectric element 1008 may vibrate at its fundamental radial mode and generate an AC output voltage which may be maintained to be constant. As an example, a feedback frequency tracking circuit between an input and output of the piezoelectric element 1008 may maintain the AC output voltage of the piezoelectric element 1008 to be constant. The output voltage from the piezoelectric element 1008 may be rectified using the AC-DC rectifier 1010. The AC-DC rectifier 1010 may comprise a single-phase diode bridge rectifier. The output voltage from the piezoelectric element 1008 may be filtered through a capacitor. The DC voltage from the AC-DC rectifier 1010 may be switched to an AC signal using the second DC-AC inverter 1014, for example, using pulse width modulation. The resulting AC signal may be an adjustable magnitude and adjustable frequency AC signal. A capacitor between the AC-DC rectifier 1010 and the second DC-AC inverter 1014 may be an energy storage element to actuate as a DC link. The resulting AC signal may be filtered through an inductance, for example, to eliminate components such as high frequency components, and sent to the piezoelectric actuator 1016.

Figure 11:
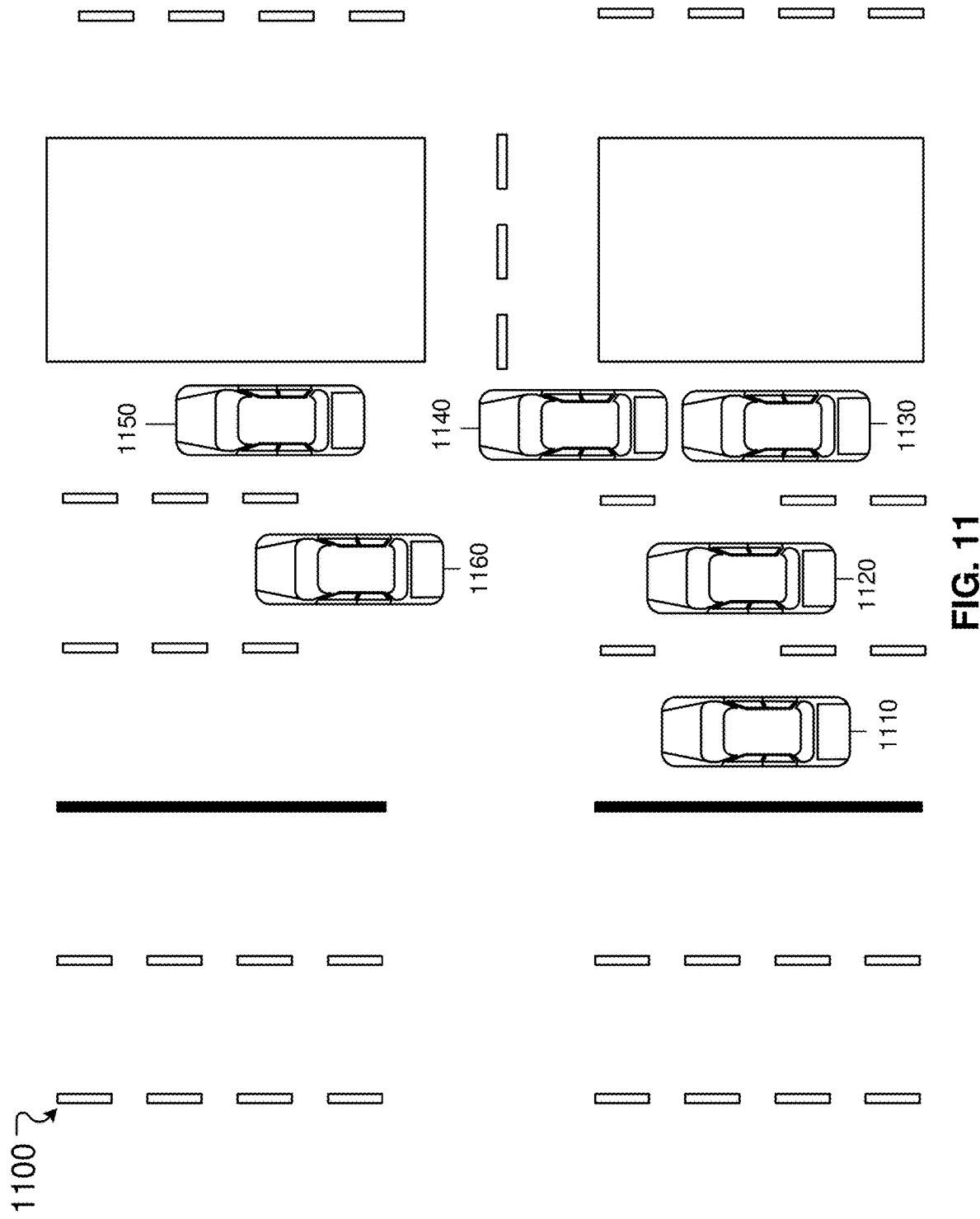
FIG. 11 illustrates an exemplary implementation of the sensor cleaning apparatus.

FIG. 11 illustrates an exemplary implementation 1100 of the sensor cleaning apparatus. In FIG. 5, a vehicle 510, which may be implemented as the vehicle 401 of FIG. 4 or the vehicle 170 of FIG. 1C, may be driving on a road with other vehicles 1120, 1130, 1140, 1150, and 1160. In some examples, the computing system 103 or 303 of the vehicle 1110 may determine an amount, concentration, or distribution of traffic, and determine an operating pressure range of the compressor 102 or 302 based on the amount, concentration, or distribution of traffic and/or predicted traffic. The computing system 103 or 303 may determine one or more operating ranges of pressures corresponding to one or more respective reservoirs based on the amount, concentration, or distribution of traffic or predicted traffic, a velocity or acceleration of the vehicle 1110, and/or a velocity or acceleration of one or more other vehicles 1120, 1130, 1140, 1150, and/or 1160.

Figure 12:
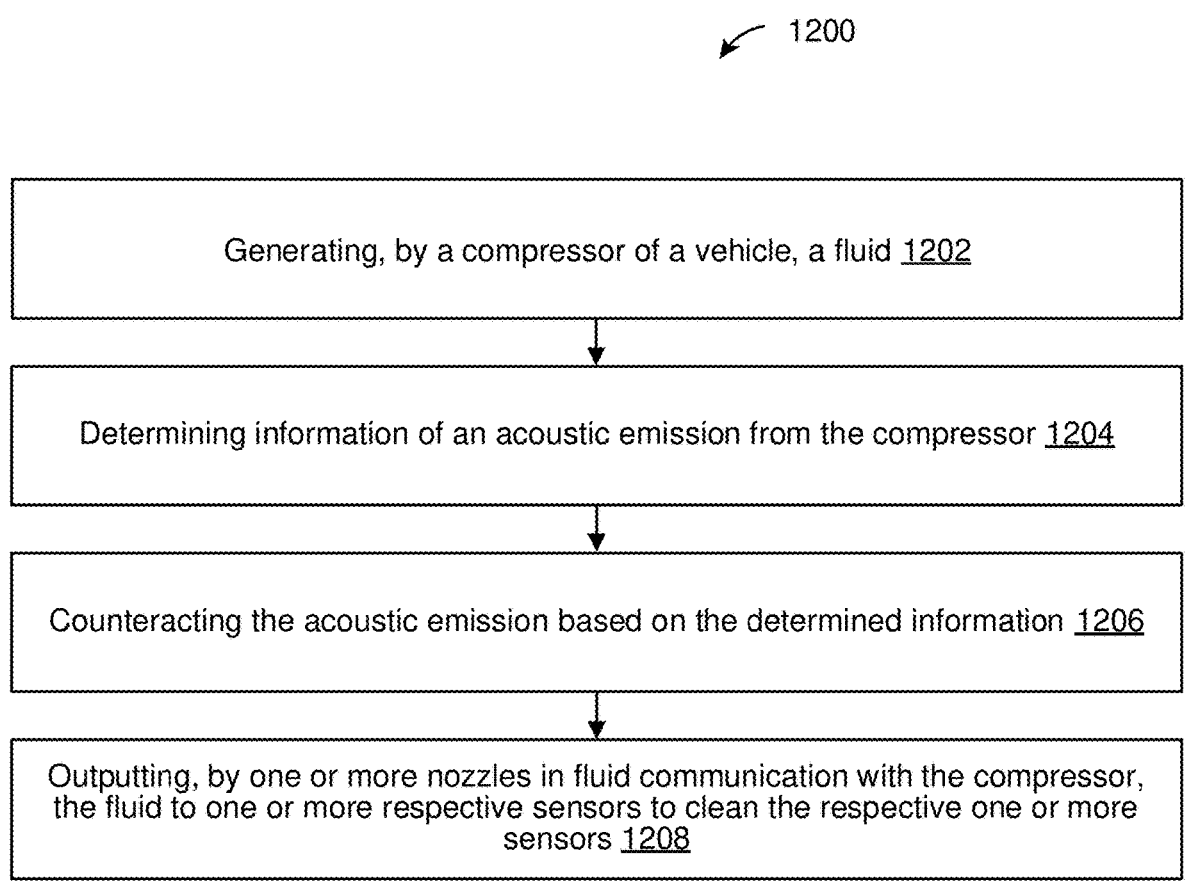
FIG. 12 is a process flow diagram of an illustrative method for cleaning one or more sensors in accordance with an example embodiment of the present disclosure.

FIG. 12 illustrates a flowchart of a method according to some embodiments. In this and other flowcharts, the flowchart 1200 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 12.

In step 1202, a fluid such as compressed air may be generated by a compressor of a vehicle. In step 1204, one or more processors of the vehicle may determine information of an acoustic emission, such as noise, from the compressor. In step 1206, one or more processors of the vehicle may counteract the acoustic emission based on the determined information. In step 1208, one or more processors of the vehicle may control one or more nozzles to output the fluid to clean one or more respective sensors. The one or more nozzles may be connected to or in fluid communication with the compressor.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 13:
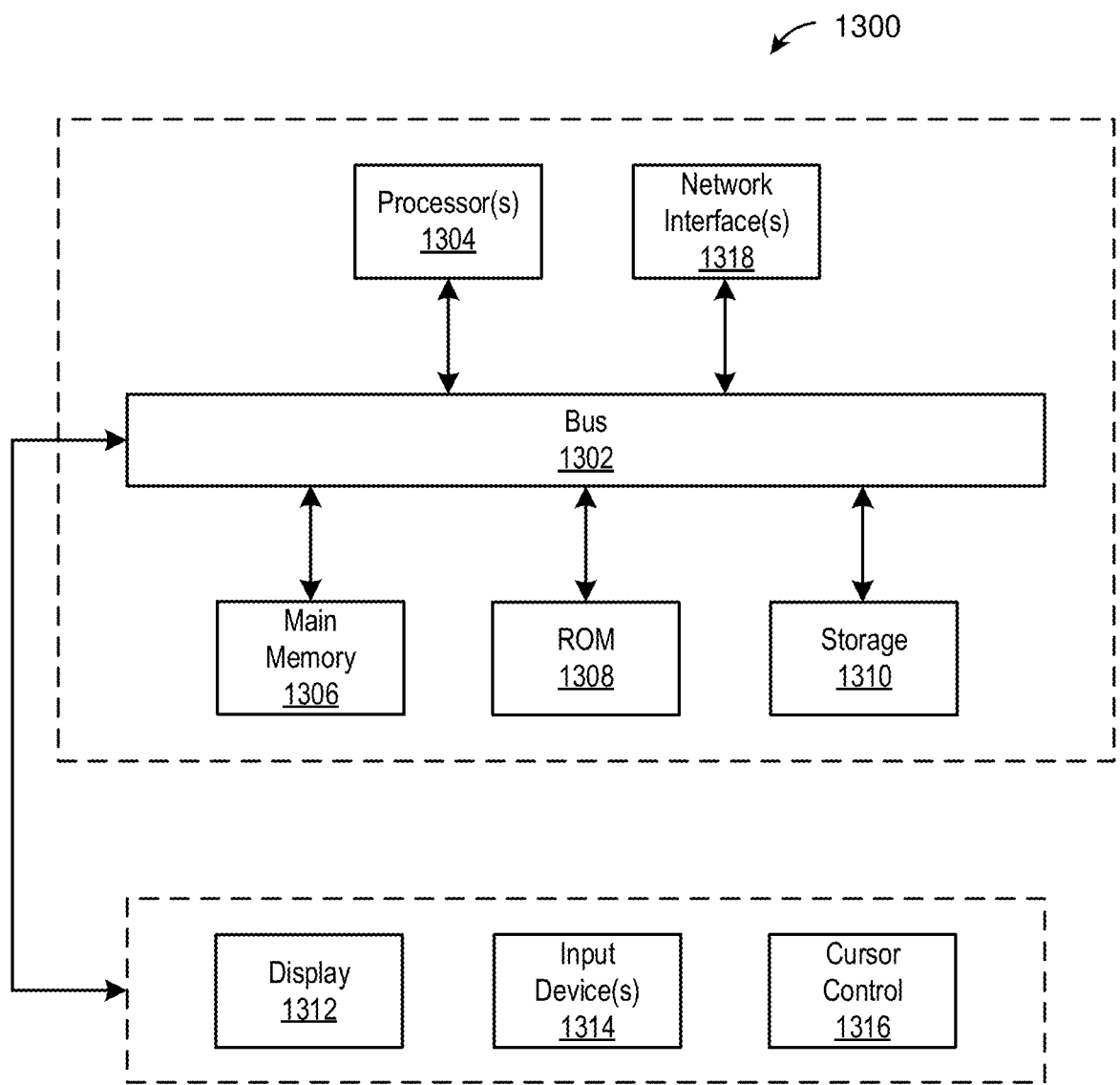
FIG. 13 is a schematic block diagram illustrating an example networked architecture configured to implement example embodiments of the present disclosure.

FIG. 13 is a block diagram that illustrates a computer system 1300 upon which any of the embodiments described herein may be implemented. The computer system 1300 includes a bus 1302 or other communication mechanism for communicating information, one or more hardware processors 1304 coupled with bus 1302 for processing information. Hardware processor(s) 1304 may be, for example, one or more general purpose microprocessors.

The computer system 1300 also includes a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

The computer system 1300 further includes a read only memory (ROM) 1308 or other static storage device coupled to bus 1302 for storing static information and instructions for processor 1304. A storage device 1310, such as a magnetic disk, optical disk, or USB thumb drive (Flash drive), etc., is provided and coupled to bus 1302 for storing information and instructions.

The computer system 1300 may be coupled via bus 1302 to output device(s) 1312, such as a cathode ray tube (CRT) or LCD display (or touch screen), for displaying information to a computer user. Input device(s) 1314, including alpha-numeric and other keys, are coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor(s) 1304 executing one or more sequences of one or more instructions contained in main memory 1306. Such instructions may be read into main memory 1306 from another storage medium, such as storage device 1310. Execution of the sequences of instructions contained in main memory 1306 causes processor(s) 1304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 1306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may retrieves and executes the instructions. The instructions received by main memory 1306 may optionally be stored on storage device 1310 either before or after execution by processor 1304.

The computer system 1300 also includes a communication interface 1318 coupled to bus 1302. Communication interface 1318 provides a two-way data communication coupling to one or more network links that are connected to one or more local networks. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN (or WAN component to communicated with a WAN). Wireless links may also be implemented. In any such implementation, communication interface 1318 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1318, which carry the digital data to and from computer system 1300, are example forms of transmission media.

The computer system 1300 can send messages and receive data, including program code, through the network (s), network link and communication interface 1318. In the Internet example, a server might transmit a requested code for an application program through the Internet, the ISP, the local network and the communication interface 1318.

The received code may be executed by processor 1304 as it is received, and/or stored in storage device 1310, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An apparatus, comprising:
  a compressor configured to generate fluid, the compressor being in fluid communication with one or more nozzles;
  a reservoir disposed downstream of the compressor and fluidly connected to the compressor, the reservoir configured to store the fluid;
  one or more valves disposed downstream of the reservoir and fluidly connected to the reservoir, the one or more valves configured to regulate flow of the fluid; and
  the one or more nozzles disposed downstream of the one or more valves and fluidly connected to the one or more valves, the one or more nozzles configured to output the fluid to clean one or more sensors, and the one or more valves configured to open in response to an interior pressure inside the reservoir being within a threshold range and the one or more valves configured to close in response to the interior pressure being outside of the threshold range.

2. The apparatus of claim 1, wherein the threshold range is based on a range of pressures to clean the one or more sensors.

3. The apparatus of claim 1, wherein a second valve of the one or more valves is configured to open in response to the concentration of dust exceeding a threshold concentration.

4. The apparatus of claim 1, wherein
  a second valve of the one or more valves is configured to open based on an air quality index (AQI) at one of the one or more nozzles.

5. The apparatus of claim 4, wherein the second valve is configured to open in response to the AQI exceeding a threshold index.

6. The apparatus of claim 1, wherein
  a second valve of the one or more valves is configured to open based on a traffic condition.

7. The apparatus of claim 6, wherein the second valve is configured to open in response to a current traffic level exceeding a threshold level.

8. The apparatus of claim 6, wherein the second valve is configured to open in response to a predicted traffic level exceeding a threshold level.

9. The apparatus of claim 6, wherein the
  second valve of the valves is configured to open based on a road condition.

10. The apparatus of claim 9, wherein the road condition comprises a bumpiness of the road.

11. A method of controlling an operation of a compressor, comprising:
  generating, by a compressor, a fluid;
  storing, by a reservoir, the fluid generated by the compressor, wherein the reservoir is disposed downstream of the compressor and fluidly connected to the compressor;
  determining an interior pressure inside a reservoir and an expected pressure loss between the reservoir and one or more nozzles, wherein the one or more nozzles are disposed downstream of the reservoir;
  determining a first operation of a first valve disposed downstream of the reservoir and upstream of the nozzles, based on the interior pressure and an expected pressure loss between the reservoir and the nozzles;
  performing the first operation on the first valve; and
  controlling a second operation of a second valve based on an air quality index (AQI) at one of the one or more nozzles.

12. The method of claim 11, wherein the first operation comprises opening the first valve to permit the fluid to travel towards the nozzles or closing the first valve to block the fluid from travelling towards the nozzles.

13. The method of claim 11, wherein the first operation comprises opening the first valve in response to the interior pressure being within a threshold range and closing the first valve in response to the interior pressure being outside of the threshold range.

14. The method of claim 11, further comprising:
  controlling a second operation of a second valve based on a concentration of dust at one of the nozzles.

15. The method of claim 14, wherein the second operation comprises opening the second valve in response to the concentration of dust exceeding a threshold concentration.

16. The method of claim 14, wherein the second operation comprises opening the second valve in response to the AQI exceeding a threshold index.

17. A method of controlling an operation of a compressor, comprising:
  generating, by a compressor, a fluid;
  storing, by a reservoir, the fluid generated by the compressor, wherein the reservoir is disposed downstream of the compressor and fluidly connected to the compressor;
  determining an interior pressure inside a reservoir and an expected pressure loss between the reservoir and one or more nozzles, wherein the nozzles are disposed downstream of the reservoir;
  determining an operation of a first valve disposed downstream of the reservoir and upstream of the nozzles, based on the interior pressure and an expected pressure loss between the reservoir and the nozzles, wherein the operation comprises opening the first valve in response to the interior pressure being within a threshold range and closing the first valve in response to the interior pressure being outside of the threshold range; and
  performing the operation on the first valve.

* * * * *